ly*12) United States Patent  
Oshima et al.

(10) Patent No.: US 7,486,487 B2
(45) Date of Patent: Feb. 3, 2009

(54) MAGNETO-RESISTIVE ELEMENT, MAGNETIC HEAD AND MAGNETIC STORAGE APPARATUS

(75) Inventors: Hirotaka Oshima, Kawasaki (JP); Reiko Kondo, Kawasaki (JP); Arata Jogo, Kawasaki (JP); Yutaka Shimizu, Kawasaki (JP); Atsushi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 340 days.

(21) Appl. No.: 11/137,008

(22) Filed: May 25, 2005

(65) Prior Publication Data

US 2005/0264953 A1    Dec. 1, 2005

Related U.S. Application Data

(63) Continuation-in-part of application No. 10/952,206, filed on Sep. 28, 2004, now abandoned.

(30) Foreign Application Priority Data

May 28, 2004  (JP)  ............... 2004-159590
Mar. 10, 2005  (JP)  ............... 2005-067898

(51) Int. Cl.
    *G11B 5/39*    (2006.01)
(52) U.S. Cl. ............................... 360/324.11
(58) Field of Classification Search ............. None
    See application file for complete search history.

(56) References Cited

U.S. PATENT DOCUMENTS

| 6,249,407 | B1 * | 6/2001 | Aoshima et al. | 360/324.2 |
| 6,348,274 | B1 * | 2/2002 | Kamiguchi et al. | 428/811 |
| 6,407,890 | B1 * | 6/2002 | Gill | 360/314 |
| 6,473,279 | B2 * | 10/2002 | Smith et al. | 360/324.12 |
| 6,661,626 | B2 * | 12/2003 | Gill | 360/324.2 |
| 6,756,135 | B2 * | 6/2004 | Hasegawa et al. | 428/811.5 |
| 6,798,625 | B1 |  9/2004 | Ueno et al. | |

(Continued)

FOREIGN PATENT DOCUMENTS

JP    2002-208744    7/2002

(Continued)

OTHER PUBLICATIONS

A. Fert et al.; "Electrical Resistivity of Ferromagnetic Nickel and Iron Based Alloys"; J. Phys. F: Metal Phys., vol. 6, No. 5, pp. 849-871; 1976.

(Continued)

*Primary Examiner*—Mark Blouin
(74) *Attorney, Agent, or Firm*—Greer, Burns & Crain, Ltd.

(57) ABSTRACT

A magneto-resistive element employs a CPP structure and includes an antiferromagnetic layer, a pinned magnetization layer, a nonmagnetic intermediate layer and a free magnetization layer that are successively stacked. The pinned magnetization layer includes a first pinned magnetization layer, a nonmagnetic coupling layer and a second pinned magnetization layer that are successively stacked on the antiferromagnetic layer, and the first and second pinned magnetization layers are antiferromagnetically exchange-coupled. One of the first and second pinned magnetization layer is formed by a ferromagnetic layer made of a ferromagnetic material at least including one element or alloy selected from a group consisting of Co, Fe, Ni and alloys thereof, and the other is formed by a resistance control layer made of a conductive ferromagnetic oxide.

22 Claims, 12 Drawing Sheets

U.S. PATENT DOCUMENTS

| | | |
|---|---|---|
| 7,099,122 B2 | 8/2006 | Yi et al. |
| 7,190,558 B2 * | 3/2007 | Iwasaki et al. .......... 360/324.11 |
| 2001/0013999 A1 * | 8/2001 | Koi et al. ................ 360/324.11 |
| 2003/0227723 A1 | 12/2003 | Li et al. |
| 2005/0152077 A1 | 7/2005 | Yuasa et al. |

OTHER PUBLICATIONS

N. Strelkov et al.; "Extension of the Semiclassical Theory of Current-perpendicular-to-plane Giant Magnetoresistance Including Spin Flip to any Multilayered Magnetic Structures"; J. Appl. Phys., vol. 94, No. 5, pp. 3278-3287; Sep. 1, 2003.

D.C. Worledge et al.; "Negative Spin-Polarization of $SrRuO_3$"; Physical Review Letters, vol. 85, No. 24, pp. 5182-5185; Dec. 11, 2000.

G. Hu et al.; "Negative Spin Polarization of $Fe_3O_4$ in Magnetite/Manganite-Based Junctions"; Physical Review Letters, vol. 89, No. 27, pp. 1-4; Dec. 30, 2002.

M. Bibes et al.; "Tunnel Magnetoresistance in Nanojunctions Based on $Sr_2FeMoO_6$"; App. Phys. Letters, vol. 83, No. 13, pp. 2629-2631; Sep. 29, 2003.

\* cited by examiner

FIG.12

| | ΔRA $(m\Omega \cdot \mu m^2)$ | ΔRA INCREASE RATE (%) | RA $(m\Omega \cdot \mu m^2)$ | MR RATE (%) |
|---|---|---|---|---|
| 2ND EMBODIMENT | 4.241 | 24 | 189 | 2.253 |
| 3RD EMBODIMENT | 4.142 | 21 | 184 | 2.255 |
| 1ST COMPARISON EXAMPLE | 3.428 | — | 173 | 1.993 |
| 4TH EMBODIMENT | 4.214 | 23 | 159 | 2.647 |
| 2ND COMPARISON EXAMPLE | 3.428 | — | 173 | 1.993 |
| 5TH EMBODIMENT | 3.961 | 52 | 200 | 1.962 |
| 3RD COMPARISON EXAMPLE | 2.608 | — | 173 | 1.511 |

MAGNETO-RESISTIVE ELEMENT, MAGNETIC HEAD AND MAGNETIC STORAGE APPARATUS

CROSS-REFERENCE TO RELATED APPLICATIONS

This application is a Continuation-In-Part Application of a U.S. patent application Ser. No. 10/952,206 filed Sep. 28, 2004 now abandoned.

This application claims the benefit of Japanese Patent Applications No. 2004-159590 filed May 28, 2004 and No. 2005-067898 filed Mar. 10, 2005, in the Japanese Patent Office, the disclosures of which are hereby incorporated by reference.

BACKGROUND OF THE INVENTION

1. Field of the Invention

The present invention generally relates to magneto-resistive elements, magnetic heads and magnetic storage apparatuses, and more particularly to a magneto-resistive element having a Current Perpendicular to Plane (CPP) structure for causing a sense current to flow in a direction in which layers are stacked by use of a so-called spin valve layer or a magnetic tunneling junction layer, a magnetic head employing such a magneto-resistive element for reproducing information from a magnetic recording medium, and a magnetic storage apparatus employing such a magneto-resistive element.

2. Description of the Related Art

Conventionally, magneto-resistive elements are used as reproducing elements for magnetic heads that reproduce recorded information from a magnetic recording medium in a magnetic storage apparatus. Magneto-resistive elements that are provided with a spin valve layer having a high magnetic field sensitivity are popularly used in order to cope with high recording densities. The spin valve layer is formed by two ferromagnetic layers, namely, a pinned magnetization layer having a magnetization direction fixed by an antiferromagnetic layer and a free magnetization layer having a magnetization direction that changes depending on a leakage magnetic field from the magnetic recording medium.

A Current-In-Plane (CIP) structure that causes the sense current to flow in an in-plane direction of the spin valve layer has mainly been used in the past. However, in order to further improve the high recording density, it is necessary to increase a linear recording density and a track density, and for this reason, an area of the magnetic recording medium covering 1 bit consequently decreases. As a result, a leakage magnetic field from the magnetic recording medium, that is, a decrease in a signal magnetic field occurs. Furthermore, in order to reproduce a high-density signal by the reproducing element, it is necessary to reduce a width and a height of the reproducing element. According to the CIP structure, the sense current must be set small in order to prevent performance deterioration due to migration and the like. For this reason, a magnitude of a variation in a detected magneto-resistance decreases, and a reproduced output becomes small as the recording density further increases, thereby making detection of fine signal magnetic fields difficult.

A Current Perpendicular to Plane (CPP) structure has been proposed as a next-generation reproducing element, and active research is being made on the CPP structure. The CPP structure causes the sense current to flow in the direction in which the layers of the spin valve layer are stacked.

FIG. 1 is a cross sectional view showing an example of a conventional magneto-resistive element employing the CPP structure. In FIG. 1, when a sense current I flows in a direction in which layers of a spin valve layer 100 employing the CPP structure are stacked, the magneto-resistance varies depending on relative directions of the magnetization of a free magnetization layer 108 and the magnetization of a ferromagnetic layer 104 of a pinned magnetization layer 105. A signal output of the magneto-resistive element is detected as a voltage variation across both ends of the spin valve layer 100. The pinned magnetization layer 105 has a stacked ferri structure in which two ferromagnetic layers 102 and 104 of a CIP structure are antiferromagnetically coupled via a nonmagnetic coupling layer 103. Since the magnetizations of the two ferromagnetic layers 102 and 104 are mutually antiparallel, the magnitude of the magnetization of the stacked ferri structure becomes small, to reduce the diamagnetism. Thus, an exchange coupling between the stacked ferri structure and the antiferromagnetic layer 101 can be increased while suppressing a net magnetization, so as to positively fix (or pin) the magnetization direction of the pinned magnetization layer 105.

However, in the case of the CPP structure, the spin valve layer 100 through which the sense current I flows has a small thickness. For this reason, an element resistance of the CPP structure is lower than that of the CIP structure, and as a result, there is a problem in that a sufficiently large signal output cannot be obtained by the CPP structure.

In order to obtain a sufficiently large signal output, it is necessary to increase a product of an amount of variation $\Delta R$ of the magneto-resistance due to a change in an external magnetic field and an area A of the spin valve layer 100, that is, an amount of variation $\Delta RA$ of the magneto-resistance per unit area. For this purpose, search is being made for suitable materials that may be used for the free magnetization layer 108 that causes magneto-resistance and the ferromagnetic layer 104 on the side of the free magnetization layer 108 forming the pinned magnetization layer 105. However, it is difficult to developed new suitable materials, and there are problems in that there is a limit to selecting the materials, and that a sufficiently large signal output cannot be obtained.

Particularly in the case of the CPP structure, the sense current flows in the direction in which the layers of the stacked ferri structure are stacked, and a resistance caused by bulk scattering is determined by a relationship of an electron spin direction and the magnetization direction. Due to the electrons passing through the two ferromagnetic layers 102 and 104 of the pinned magnetization layer 105 having anti-parallel magnetization directions, a difference between the two resistances decrease, and there is a problem in that the signal output is further decreased thereby.

SUMMARY OF THE INVENTION

Accordingly, it is a general object of the present invention to provide a novel and useful magneto-resistive element, magnetic head and magnetic storage apparatus, in which the problems described above are suppressed.

Another and more specific object of the present invention is to provide a magneto-resistive element, a magnetic head and a magnetic storage apparatus, which can increase a variation $\Delta RA$ of a magneto-resistance per unit area, and realize a CPP structure having a good magneto-resistance variation rate.

Still another object of the present invention is to provide a magneto-resistive element employing a Current Perpendicular to Plane (CPP) structure, comprising an antiferromagnetic layer, a pinned magnetization layer, a nonmagnetic intermediate layer and a free magnetization layer that are successively stacked, said pinned magnetization layer comprising a first pinned magnetization layer, a nonmagnetic coupling layer and a second pinned magnetization layer that are successively stacked on the antiferromagnetic layer, said first and second pinned magnetization layers being antiferromagnetically exchange-coupled, one of said first and second pinned magnetization layer being formed by a ferromagnetic layer made of a ferromagnetic material at least including one element or alloy selected from a group consisting of Co, Fe, Ni and alloys thereof, the other of said first and second pinned magnetization layer being formed by a resistance control layer made of a ferromagnetic material at least including one element or alloy selected from a group consisting of Co, Fe, Ni and alloys thereof, and an additive element, said additive element being at least one element or alloy selected from a group consisting of B, C, N, O, F, Sc, Ti, V, Cr, Mn, Zn, Ga, Ge, As, Se, Y, Zr, Nb, Mo, Tc, Ru, Rh, Pd, Ag, Cd, In, Sn, Sb, Te, Hf, Ta, W, Re, Os, Ir, Pt, Au, Hg, Tl, Pb, Bi, Po, At and alloys thereof. According to the magneto-resistive element of the present invention, it is possible to make the scattering asymmetry related to the spin-dependent bulk scattering of the electrons flowing through the pinned magnetization layer smaller for the first pinned magnetization layer than the second pinned magnetization layer, so as to increase a variation $\Delta RA$ of a magneto-resistance per unit area and realize a CPP structure having an improved magneto-resistance variation rate.

A further object of the present invention is to provide a magneto-resistive element employing a Current Perpendicular to Plane (CPP) structure, comprising an antiferromagnetic layer, a pinned magnetization layer, a nonmagnetic intermediate layer and a free magnetization layer that are successively stacked, said pinned magnetization layer comprising a first pinned magnetization layer, a nonmagnetic coupling layer and a second pinned magnetization layer that are successively stacked on the antiferromagnetic layer, said first and second pinned magnetization layers being antiferro-magnetically exchange-coupled, one of said first and second pinned magnetization layer being formed by a ferromagnetic layer made of a ferromagnetic material at least including one element or alloy selected from a group consisting of Co, Fe, Ni and alloys thereof, the other of said first and second pinned magnetization layer being formed by a resistance control layer made of a conductive ferromagnetic oxide. According to the magneto-resistive element of the present invention, it is possible to increase a variation $\Delta RA$ of a magneto-resistance per unit area and realize a CPP structure having an improved magneto-resistance variation rate.

Another object of the present invention is to provide a magneto-resistive element employing a Current Perpendicular to Plane (CPP) structure, comprising an antiferromagnetic layer, a pinned magnetization layer, a nonmagnetic intermediate layer and a free magnetization layer that are successively stacked, said pinned magnetization layer comprising a first pinned magnetization layer, a nonmagnetic coupling layer and a second pinned magnetization layer that are successively stacked on the antiferromagnetic layer, said first and second pinned magnetization layers being antiferro-magnetically exchange-coupled, said first and second pinned magnetization layers being made of ferromagnetic materials having mutually different scattering asymmetries. According to the magneto-resistive element of the present invention, it is possible to increase a variation $\Delta RA$ of a magneto-resistance per unit area and realize a CPP structure having an improved magneto-resistance variation rate.

Still another object of the present invention is to provide a magnetic head comprising a recording element, and a magneto-resistive element having any one of the structures described above. According to the magnetic head of the present invention, it is possible to increase a variation $\Delta RA$ of a magneto-resistance per unit area and realize a CPP structure having an improved magneto-resistance variation rate. Hence, it is possible to realize a high-density recording using the highly sensitive magnetic head.

Still another object of the present invention is to provide a magnetic storage apparatus comprising a magnetic head configured to record information on and reproduce information from a magnetic recording medium, where the magnetic head comprises a recording element and a magneto-resistive element having any one of the structures described above. According to the magnetic storage apparatus of the present invention, it is possible to increase a variation $\Delta RA$ of a magneto-resistance per unit area and realize a CPP structure having an improved magneto-resistance variation rate. Hence, it is possible to realize a high-density recording using the highly sensitive magnetic head.

Other objects and further features of the present invention will be apparent from the following detailed description when read in conjunction with the accompanying drawings.

BRIEF DESCRIPTION OF THE DRAWINGS

FIG. 12 is a diagram showing a variation $\Delta RA$ of a magneto-resistance and a magneto-resistance variation rate for embodiments and comparison examples;

DESCRIPTION OF THE PREFERRED EMBODIMENTS

First, a description will be given of an operating principle of the present invention. Spin-dependent interfacial scattering generated at an interface between a ferromagnetic layer and a nonmagnetic layer, and spin-dependent bulk scattering generated within the ferromagnetic layer cause a magneto-resistance. Contributions of these scatterings to the magneto-resistance depend on a structure of a magneto-resistive element. But normally, it may be regarded that the contributions of the spin-dependent interfacial scattering and the spin-dependent bulk scattering to the magneto-resistance are approximately the same. The present invention focuses mainly on the spin-dependent bulk scattering, and a description of the spin-dependent interfacial scattering will be omitted for the sake of convenience.

Figure 1:
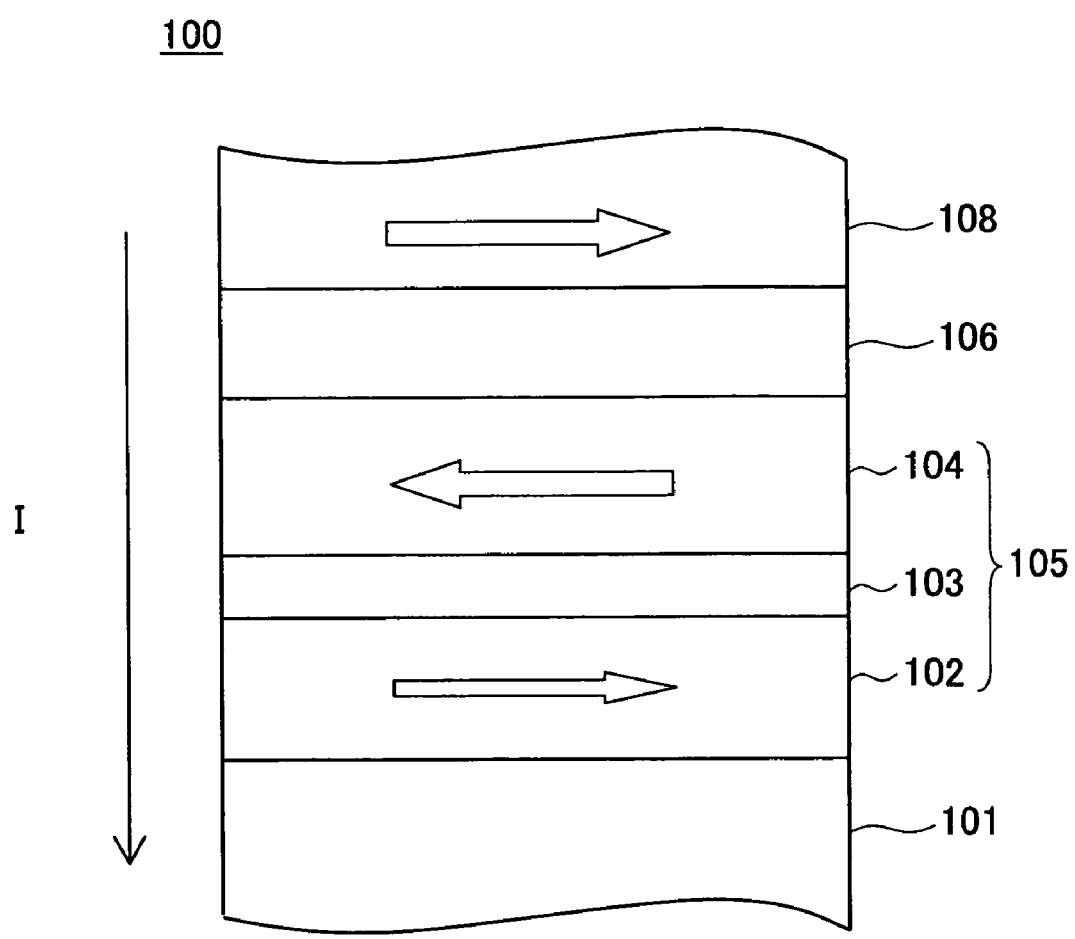
FIG. 1 is a cross sectional view showing an example of a conventional magneto-resistive element employing a CPP structure.
Figure 2A:
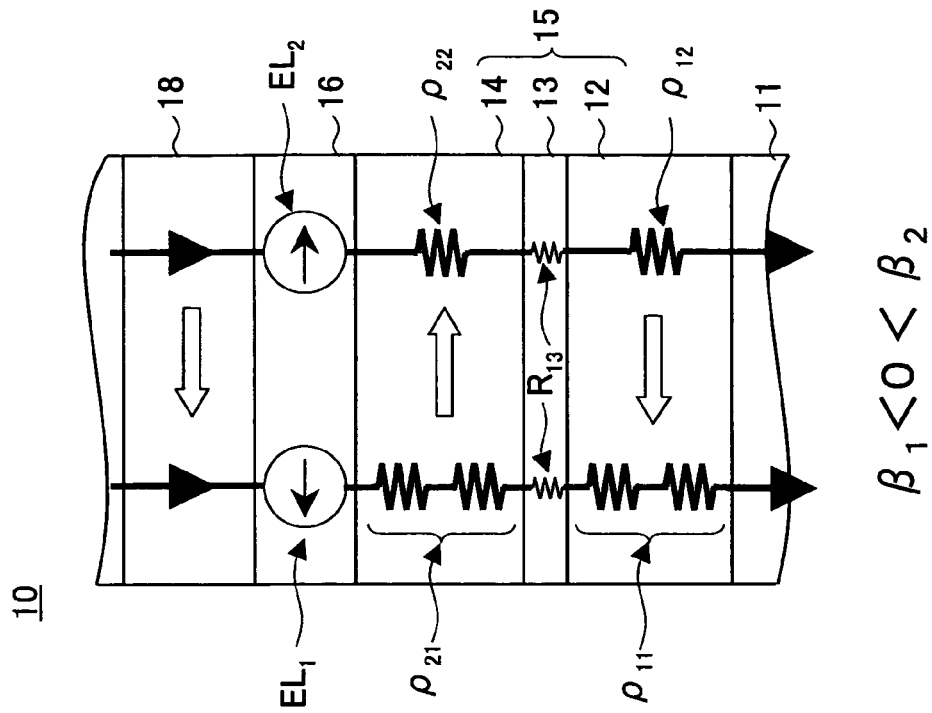
FIGS. 2A and 2B are diagrams for explaining an operating principle of the present invention.
Figure 2B:
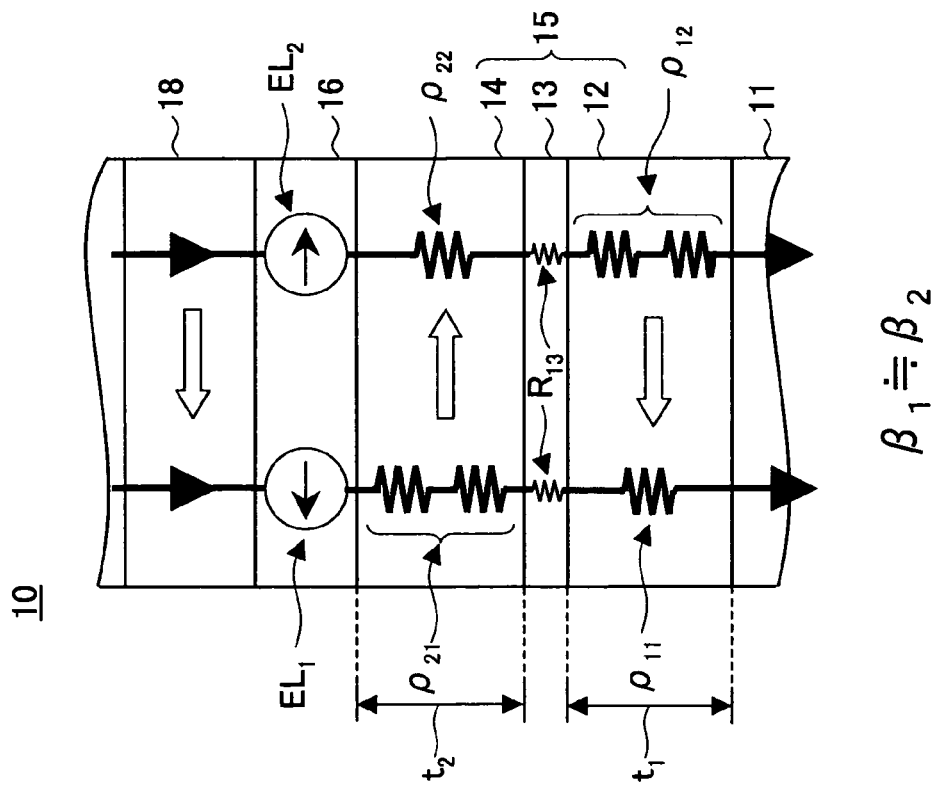

FIGS. 2A and 2B are diagrams for explaining the operating principle of the present invention. As shown in FIGS. 2A and 2B, electrons passing through a GMR layer 10 include electrons $EL_1$ having an up spin with respect to a magnetization direction of a free magnetization layer 16, and electrons $EL_2$ having a down spin with respect to the magnetization direction of the free magnetization layer 16. These electrons $EL_1$ and $EL_2$ pass through a pinned magnetization layer 15 and flow to a lower electrode (not shown) via an antiferromagnetic layer 11. The pinned magnetization layer 15 has a stacked ferri structure having a first pinned magnetization layer 12 located closer to the antiferromagnetic layer 11, a nonmagnetic coupling layer 13, and a second pinned magnetization layer 14 located closer to a nonmagnetic intermediate layer 16. The first and second pinned magnetization layers 12 and 14 are antiferromagnetically exchange-coupled via the nonmagnetic coupling layer 13, and have magnetization directions that are mutually antiparallel. The electrons $EL_1$ having the up spin and the electrons $EL_2$ having the down spin generate resistivities $\rho_{21}$ and $\rho_{22}$ due to the bulk scattering at the second pinned magnetization layer 14, and further generate resistivities $\rho_{11}$ and $\rho_{12}$ due to the bulk scattering at the first pinned magnetization layer 12.

A resistivity $\rho$ may be represented by $\rho = 2\rho^*(1-\beta)$ if the magnetization direction of the first pinned magnetization layer 12 or the second pinned magnetization layer 14 and the spin is parallel, and may be represented by $\rho = 2\rho^*(1+\beta)$ if the magnetization direction of the first pinned magnetization layer 12 or the second pinned magnetization layer 14 and the spin is antiparallel, where $\rho^*$ denotes a proportionality constant peculiar to each material and $\beta$ denotes a scattering asymmetry (or spin asymmetry coefficient). It is assumed that the first and second pinned magnetization layers 12 and 14 respectively have scattering asymmetries $\beta_1$ and $\beta_2$, proportionality constants $\rho_1$ and $\rho_2$, and thicknesses $t_1$ and $t_2$.

A resistance sensed by the electron $EL_1$ having the up spin and passing through the second pinned magnetization layer 14 may be described by the following formula, where $R_{13}$ denotes a resistance caused by the nonmagnetic coupling layer 13.

$$\rho\uparrow(t_1+t_2) = \rho_{11} \times t_1 + \rho_{21} \times t_2 + R_{13} \quad (1)$$
$$= 2\rho_1*(1-\beta_1) \times t_1 + 2\rho_2*(1+\beta_2) \times t_2 + R_{13}$$

A resistance sensed by the electron $EL_2$ having the down spin may be described by the following formula.

$$\rho\downarrow(t_1+t_2) = \rho_{12} \times t_1 + \rho_{22} \times t_2 + R_{13} \quad (2)$$
$$= 2\rho_1*(1+\beta_1) \times t_1 + 2\rho_2*(1-\beta_2) \times t_2 + R_{13}$$

A difference between the resistance sensed by the electron $EL_1$ having the up spin and the resistance sensed by the electron $EL_2$ having the down spin can be obtained from the following formula (2), by subtracting the formula (2) from the formula (1).

$$(\rho\uparrow-\rho\downarrow)(t_1+t_2) = 4(\rho_2*\times\beta_2\times t_2 - \rho_1*\times\beta_1\times t_1) \quad (3)$$

If it is assumed for the sake of convenience that the proportionality constants $\rho_1^*$ and $\rho_2^*$ are approximately the same such that $\rho_1^* = \rho_2^* = \rho^*$ and the thicknesses $t_1$ and $t_2$ are approximately the same such that $t_1 = t_2 = t$, the formula (3) can be rewritten as the following formula (4).

$$(\rho\uparrow-\rho\downarrow)(t_1+t_2) = 4\rho^*(\beta_2-\beta_1) \quad (4)$$

Accordingly, from the formula (4), the difference between the resistance sensed by the electron $EL_1$ having the up spin and the resistance sensed by the electron $EL_2$ having the down spin becomes small if the scattering asymmetries $\beta_1$ and $\beta_2$ are approximately the same as shown in FIG. 2A, and as a result, an asymmetry of a spin-dependent resistance of the pinned magnetization layer 15 as a whole decreases. In other words, with respect to the electron flowing from the free magnetization layer 18 to the second pinned magnetization layer 14, the first pinned magnetization layer 12 applies a resistance that has a reverse spin asymmetry as the second pinned magnetization layer 14, and for this reason, the difference between the resistance sensed by the electron $EL_1$ having the up spin and the resistance sensed by the electron $EL_2$ having the down spin becomes decreases.

Hence, according to one aspect of the present invention, a material having the scattering asymmetry $\beta_1$ that is smaller than the scattering asymmetry $\beta_2$ of the second pinned magnetization layer 14 is used for the first pinned magnetization layer 12, so as to increase the difference between the resistance sensed by the electron $EL_1$ having the up spin and the resistance sensed by the electron $EL_2$ having the down spin. As a result, as shown in FIG. 2B which shows a case where the scattering asymmetry $\beta_1$ has a negative value, the resistance sensed by the electron $EL_1$ having the up spin is larger than the resistance sensed by the electron $EL_2$ having the down spin in the first pinned magnetization layer 12, and the difference between the resistance sensed by the electron $EL_1$ having the up spin and the resistance sensed by the electron $EL_2$ having the down spin increases for the pinned magnetization layer 15 as a whole.

When the scattering asymmetry $\beta_1$ is said to be smaller than the scattering asymmetry $\beta_2$, it is assumed for the sake of convenience in this specification that if the scattering asymmetry $\beta_2$ has a positive value, the scattering asymmetry $\beta_1$ has an absolute value smaller than the scattering asymmetry $\beta_2$ or, the scattering asymmetry $\beta_1$ has a negative value.

Therefore, it is possible to increase a variation $\Delta RA$ of a magneto-resistance that is generated depending on a change in the magnetization direction of the free magnetization layer 16 with respect to the magnetization direction of the pinned magnetization layer 15.

When using for the first pinned magnetization layer 12 a ferromagnetic material having the scattering asymmetry $\beta_1$ that is smaller than the scattering asymmetry $\beta_2$ of the second pinned magnetization layer 14, the material may be made of at least one element or alloy selected from a group consisting of Co, Fe, Ni and alloys thereof and an additive element. The additive element is made of at least one element or alloy selected from a group consisting of B, C, N, O, F, Sc, Ti, V, Cr, Mn, Zn, Ga, Ge, As, Se, Y, Zr, Nb, Mo, Tc, Ru, Rh, Pd, Ag, Cd, In, Sn, Sb, Te, Hf, Ta, W, Re, Os, Ir, Pt, Au, Hg, Tl, Pb, Bi, Po, At and alloys thereof. Further, an atomic concentration of the additive element in the ferromagnetic material forming the first pinned magnetization layer 12 is higher than that of the second pinned magnetization layer 14. It has been reported in A. Fert et al., J. Phys. F6, p. 840, 1976, for example, that the scattering asymmetry β of the ferromagnetic material can be made small by adding Mn, Cr, V, Ti or the like with respect to a bulk material forming the ferromagnetic material. The present inventor found that the variation ΔRA of the magneto-resistance can be increased by using for the first pinned magnetization layer 12 the ferromagnetic material that is added with the additive element described above.

As is evident from the formula (4) described above, similar effects can be obtained in a case where a relationship $\beta_1 > \beta_2$ stands between the scattering asymmetry $\beta_1$ of the first pinned magnetization layer 12 and the scattering asymmetry $\beta_2$ of the second pinned magnetization layer 14. Particularly notable effects are obtained when the scattering asymmetry $\beta_1$ has a positive value and the scattering asymmetry $\beta_2$ has a negative value. For example, a ferromagnetic material used for the second pinned magnetization layer 14 may be FeCr, and the ferromagnetic material used for the first pinned magnetization layer 12 may be FeCo or FeCoNi.

Therefore, according to the present invention, it is possible to increase the variation ΔRA of the magneto-resistance while maintaining the advantages of suppressing the diamagnetic field of the stacked ferri structure of the pinned magnetization layer 15 and securing a sufficient exchange-coupling between the antiferromagnetic layer 11 and the free magnetization layer 16. Hence, it is possible to realize a magneto-resistive element having a good magneto-resistance variation rate.

Next, a description will be given of various embodiments of a magneto-resistive element according to the present invention, a magnetic head according to the present invention, and a magnetic storage apparatus according to the present invention, by referring to FIGS. 3 through 14.

First, a description will be given of a first embodiment of the magneto-resistive element according to the present invention, and a composite magnetic head having an induction type recording element.

Figure 3:
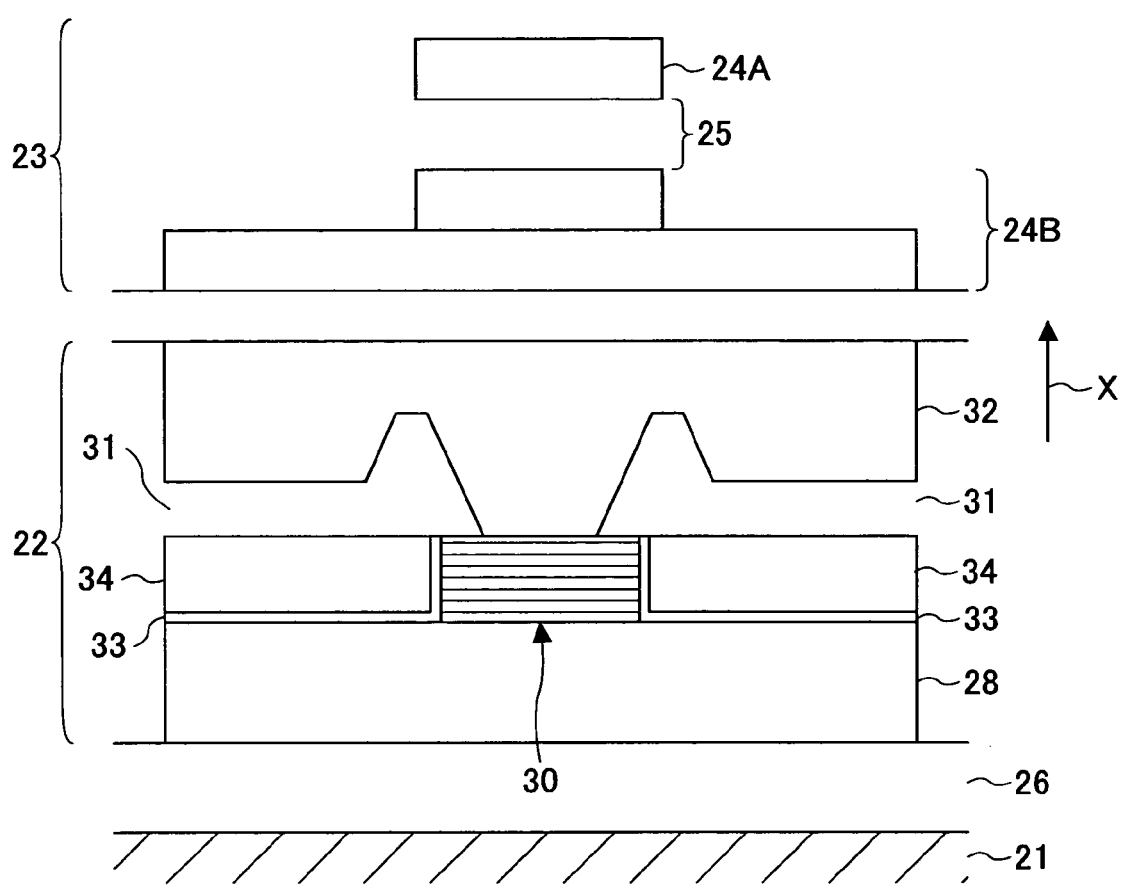
FIG. 3 is a diagram showing a structure of a medium confronting side of a composite magnetic head.

FIG. 3 is a diagram showing a structure of a medium confronting side of the composite magnetic head. In FIG. 3, an arrow X indicates a moving direction of a magnetic recording medium.

As shown in FIG. 3, a composite magnetic head 20 generally includes a flat ceramic substrate 21 which forms a base of a head slider, a magneto-resistive element 22 formed on the ceramic substrate 21, and an induction type recording element 23 formed on the magneto-resistive element 22. The ceramic substrate 21 may be made of $Al_2O_3$—TiC or the like.

The induction type recording element 23 has an upper magnetic pole 24A, a lower magnetic pole 24B, a yoke (not shown) and a coil (not shown). The upper magnetic pole 24A is provided on the medium confronting side of the composite magnetic head, and has a width corresponding to a track width of the magnetic recording medium. The lower magnetic pole 24B confronts the upper magnetic pole 24A via a recording gap layer 25 that is made of a nonmagnetic material. The yoke magnetically couples the upper and lower magnetic poles 24A and 24B. The coil is wound around the yoke and induces a magnetic field in response to a recording current. The upper and lower magnetic poles 24A and 24B and the yoke are made of a soft magnetic material having a large saturation magnetic flux density in order to secure a recording magnetic field, such as $Ni_{80}Fe_{20}$, CoZrNb, FeN, FeSiN and FeCo alloys.

The induction type recording element 23 has an alumina layer 26 formed on a surface of the ceramic substrate 21, with the lower electrode 28, a GMR layer 30, an alumina layer 31 and the upper electrode 32 successively stacked on the alumina layer 26. The upper electrode 32 is constricted by the alumina layer 31. The lower electrode 28, the GMR layer 30 and the upper electrode 32 are electrically coupled. A (magnetic) domain control layer 34 is formed on both sides of the GMR layer 30 via an insulator layer 33 having a thickness of approximately 10 nm or less. For example, the domain control layer 34 has a stacked structure made of a Cr layer and a CoCrPt layer, and prevents generation of Barkhausen noise by causing a pinned magnetization layer 43 and a free magnetization layer 45 (both not shown in FIG. 3) which form the GMR layer 30 to become single domain. The pinned magnetization layer 43 and the free magnetization layer 45 will be described later in conjunction with FIG. 4. A sense current to detect a resistance variation flows from the upper electrode 32 to the lower electrode 28 via the GMR layer 30. Hence, a magnetic resistance of the GMR layer 30 that varies in correspondence with a leakage magnetic field from the magnetic recording medium can be detected as a signal voltage, so as to reproduce the recorded information from the magnetic recording medium. In addition to the function of providing a flow path for the sense current, the upper and lower electrodes 28 and 32 also have the function of providing a magnetic shield. For this reason, the upper and lower electrodes 28 and 32 are made of a soft magnetic material such as NiFe and CoFe. Moreover, the upper and lower electrodes 28 and 32 may also be formed by a stacked structure of layers made of conductive materials such as Cu, Ta and Ti, for example. Further, the magneto-resistive element 22 and the induction type recording element 23 are covered by a layer of alumina, carbon hydride or the like to prevent the magneto-resistive element 22 and the induction type recording element 23 from corrosion and the like.

Figure 4:
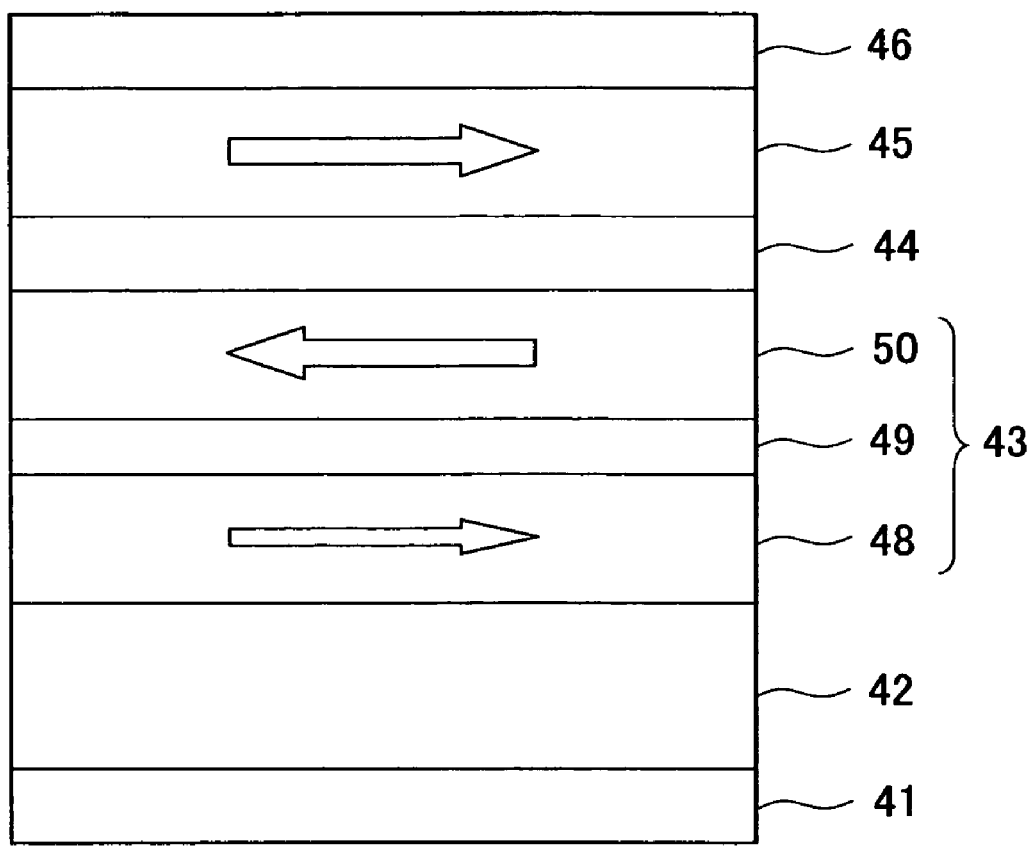
FIG. 4 is a cross sectional view showing a GMR layer forming a first embodiment of a magneto-resistive element according to the present invention.

FIG. 4 is a cross sectional view showing a GMR layer forming the first embodiment of the magneto-resistive element according to the present invention.

The magneto-resistive element shown in FIG. 4 has a CPP structure including the GMR layer 30 having a single spin valve structure. The GMR layer 30 includes an underlayer 41, an antiferromagnetic layer 42, a pinned magnetization layer 43, a nonmagnetic intermediate layer 44, a free magnetization layer 45 and a protection layer 46 that are successively stacked. The pinned magnetization layer 43 has a stacked structure including a first pinned magnetization layer 48, a nonmagnetic coupling layer 49 and a second pinned magnetization layer 50 that are successively stacked on the antiferromagnetic layer 42.

The underlayer 41 is formed on the surface of the lower electrode 18 shown in FIG. 3 by sputtering or the like. For example, the underlayer 41 may be formed by a stacked structure made up of a Ta layer having a thickness of 5 nm and a NiFe layer having a thickness of 5 nm or, a single NiCr layer. Preferably, a Fe-content of the NiFe layer is in a range of 17 atomic percent (at. %) to 25 at. %. The antiferromagnetic layer 42 may be grown epitaxially on the surface of the underlayer 41, which is a (111) crystal face or a crystal face equivalent thereto, so as to improve the crystal properties of the antiferromagnetic layer 42. The (111) crystal face corresponds to a crystal growth direction of the NiFe layer.

The antiferromagnetic layer 42 may be formed on the surface of the underlayer 41 by sputtering, evaporation, Chemical Vapor Deposition (CVD) or the like. The antiferromagnetic layer 42 may be made of a Mn-TM alloy having a thickness in a range of 5 nm to 30 nm and more preferably in a range of 10 nm to 20 nm or, made of a MnRh alloy, where TM includes at least one element selected from a group consisting of Pt, Pd, Ni and Ir. By carrying out a thermal process after forming the antiferromagnetic layer 42 from the above described alloy by the sputtering or the like, the alloy becomes an ordered alloy and the ferromagnetic properties are generated. In addition, by applying an external magnetic field in a desired magnetization direction when carrying out the thermal process, it is possible to pin the magnetization direction of the pinned magnetization layer 43 by the mutual interaction of the exchange between the antiferromagnetic layer 42 and the pinned magnetization layer 43. The thermal process may be carried out after forming the protection layer 46. For example, the thermal process may be carried out under vacuum atmosphere at a heating temperature in a range of 250° C. to 280° C. for a heating time of approximately 3 hours, within a magnetic field by applying a magnetic field of 1592 kA/m.

The first pinned magnetization layer 48 and the second pinned magnetization layer 50 are made of a ferromagnetic material, and are antiferromagnetically exchange-coupled via the nonmagnetic coupling layer 49.

The first pinned magnetization layer 48 is formed by a resistance control layer that is made of a ferromagnetic material including at least one element or alloy selected from a group consisting of Co, Fe, Ni and alloys thereof and an additive element, and has a thickness in a range of 1 nm to 30 nm. The additive element is made of at least one element or alloy selected from a group consisting of B, C, N, O, F, Sc, Ti, V, Cr, Mn, Zn, Ga, Ge, As, Se, Y, Zr, Nb, Mo, Tc, Ru, Rh, Pd, Ag, Cd, In, Sn, Sb, Te, Hf, Ta, W, Re, Os, Ir, Pt, Au, Hg, Tl, Pb, Bi, Po, At and alloys thereof. By adding the additive element to the ferromagnetic material including at least one element or alloy selected from the group consisting of Co, Fe, Ni and alloys thereof, it is possible to make the scattering asymmetry $\beta$ of the first pinned magnetization layer 48 smaller than that of the second pinned magnetization layer 50, and to increase the variation $\Delta RA$ of the magneto-resistance. In this embodiment, the first pinned magnetization layer 48 is formed by the single resistance control layer, and thus, both the first pinned magnetization layer and the single resistance control layer will be designated by the same reference numeral "48".

Preferably, the resistance control layer 48 is made of a ferromagnetic material including FeCo and at least one element or alloy selected from a group consisting of Ru, Ta, Cr, V and alloys thereof. Such a ferromagnetic material may be FeCoRu, FeCoTa, FeCoCr, FeCoCr, FeCoV, FeCoCrTa or the like. Of course, the additive element described above may further be added to such a ferromagnetic material. Moreover, the resistance control layer 48 may be formed by a ferromagnetic material including FeCoNi that is added with the additive element described above.

A concentration of the additive element in the resistance control layer 48 may be to any extent that does not cause the ferromagnetic properties to be lost. The concentration of the additive element may be set in a range of 5 at. % to 70 at. % with reference to a composition of the resistance control layer 48. Depending on the additive element, it is possible to make the scattering asymmetry $\beta$ smaller as the concentration of the additive element becomes higher. For example, a FeCoRu resistance control layer 48 preferably has an Ru concentration in a range of 5 at. % to 30 at. % with the remainder being FeCo, a FeCoTa resistance control layer 48 preferably has a Ta concentration in a range of 5 at. % to 20 at. % with the remainder being FeCo, a FeCoV resistance control layer 48 preferably has a V concentration in a range of 5 at. % to 60 at. % with the remainder being FeCo, a CoCr resistance control layer 48 preferably has a Cr concentration in a range of 5 at. % to 70 at. % with the remainder being Co.

When using Cu as the additive element for the first pinned magnetization layer (resistance control layer) 48, it is possible to set a Cu concentration in a range higher than 20 at. % with respect to Co, Fe, Ni or alloys thereof, so as to decrease the scattering asymmetry $\beta$ for the resistance control layer 48. On the other hand, as will be described later, the present inventor has found that the scattering asymmetry $\beta$ of the resistance control layer 48 increases when a small amount of Cu is added compared to a case where no Cu is added.

In addition, a conductive ferromagnetic oxide may be used for the first pinned magnetization layer (resistance control layer) 48. Suitable conductive ferromagnetic oxides for use as the first pinned magnetization layer (resistance control layer) 48 include materials having a spinel structure represented by a molecular formula $AB_2O_4$, where A is at least one kind of element selected from Zn, Fe, Co, Ni, Cu, Mg and Li, and B is at least one kind of element selected from Fe, Co, Ni and Mn. Such ferromagnetic oxides $AB_2O_4$ can make the scattering asymmetry $\beta$ smaller than that of the second pinned magnetization layer 50. Such ferromagnetic oxides $AB_2O_4$ include $ZnFe_2O_4$, $MnFe_2O_4$, $Fe_3O_4$, $CoFe_2O_4$, $NiFe_2O_4$, $CuFe_2O_4$, $MgFe_2O_4$ and $Li_{0.5}Fe_{2.5}O_4$.

Suitable conductive ferromagnetic oxides for use as the first pinned magnetization layer (resistance control layer) 48 include materials made up of ZnO and at least one kind of element selected from Fe, Co, Ni, Cr and Mn. Such ferromagnetic oxides can the scattering asymmetry $\beta$ smaller than that of the second pinned magnetization layer 50.

Furthermore, suitable conductive ferromagnetic oxides for use as the first pinned magnetization layer (resistance control layer) 48 include $Fe_3O_4$, $SrRuO_3$ and $Sr_2FeMoO_6$. Such ferromagnetic oxides are known to have a scattering asymmetry $\beta$ that takes a negative value, as reported in Worledge et al., "Negative Spin-Polarization of $SrRuO_3$", Physical Review Letters, Vol. 85, No.24, pp. 5182-5185, 11 Dec. 2000, Hu et al., "Negative Spin Polarization of $Fe_3O_4$ in Magnetite/Manganite-Based Junctions", Physical Review Letters, Vol. 89, No.27, pp. 276601-1-276601-4, 30 Dec. 2002, and Bibes et al., "Tunnel magnetoresistance in nanojunctions based on $Sr_2FeMoO_6$", Applied Physics Letters, Vol. 83, No. 13, pp. 2629-2631, 29 Sep. 2003. Accordingly, it is possible to increase the variation $\Delta RA$ of the magneto-resistance.

The second pinned magnetization layer 50 may be made of a ferromagnetic material including Co, Fe, Ni or alloys thereof, and has a thickness in a range of 1 nm to 30 nm. For example, such a ferromagnetic material used for the second pinned magnetization layer 50 may be FeCo, NiFe, FeCoCu or the like. In addition, the additive element used for the resistance control layer 48 may also be included in the second pinned magnetization layer 50 to an extent such that the effects of the present invention are not lost.

The second pinned magnetization layer 50 may include the same element or alloy as the resistance control layer 48, and have a concentration of the additive element set lower than that of the resistance control layer 48. In this case, it is possible to make the scattering asymmetry $\beta$ of the resistance control layer 48 smaller than that of the second pinned magnetization layer 50. The second pinned magnetization layer 50 may be made of a single layer or, a stacked structure formed by two or more stacked layers.

The present inventor has found that the second pinned magnetization layer 50 that is made of Co, Fe, Ni or alloys thereof may be added with Cu in a range of 5 at. % to 15 at. %, and that the scattering asymmetry β of the second pinned magnetization layer 50 increases by the addition of Cu within this range compared to a case where no Cu is added.

Preferable combinations of the first pinned magnetization layer 48 and the second pinned magnetization layer 50, that is, [first pinned magnetization layer 48]:[second pinned magnetization layer 50] include [FeCoRu]:[FeCo], [FeCoRu]:[FeCoCu], [FeCoRu]:[FeCoCu/FeCo], [FeCoRu]:[CoNiFe], [FeCoTa]:[FeCo], [FeCoTa]:[FeCoCu], [FeCoTa]:[FeCoCu/FeCo], [FeCoTa]:[CoNiFe], [CoCr]:[FeCo], [CoCr]:[CoNiFe], [FeCr]:[FeCo], [FeCr]:[FeCoCu], [FeCr]:[FeCoCu/FeCo], [FeCr]:[CoNiFe], [FeV]:[FeCo], [FeV]:[FeCoCu], [FeV]:[FeCoCu/FeCo] and [FeV]:[CoNiFe], where a symbol "/" indicates a stacked structure made up of 2 layers. For example, "FeCoCu/FeCo" indicates a stacked structure made up of a FeCoCu layer and a FeCo layer. In these combinations, the Cu concentration in the FeCoCu second pinned magnetization layer 50 is in a range of 5 at. % to 15 at. %.

Further preferable combinations of the first pinned magnetization layer 48 and the second pinned magnetization layer 50, that is, [first pinned magnetization layer 48]:[second pinned magnetization layer 50] include [Fe$_3$O$_4$]:[FeCo], [Fe$_3$O$_4$]:[FeCoCu], [Fe$_3$O$_4$]:[FeCoCu/FeCo], [Fe$_3$O$_4$]:[CoNiFe], [Fe$_3$O$_4$]:[CoNiFe/FeCo], [SrRuO$_3$]:[FeCo], [SrRuO$_3$]:[FeCoCu], [SrRuO$_3$]:[FeCoCu/FeCo], [SrRuO$_3$]:[CoNiFe], [SrRuO$_3$]:[CoNiFe/FeCo], [Sr$_2$FeMoO$_6$]:[FeCo], [Sr$_2$FeMoO$_6$]:[FeCoCu], [Sr$_2$FeMoO$_6$]:[FeCoCu/FeCo], [Sr$_2$FeMoO$_6$]:[CoNiFe] and [Sr$_2$FeMoO$_6$]:[CoNiFe/FeCo], where a symbol "/" indicates a stacked structure made up of 2 layers. For example, "FeCoCu/FeCo" indicates a stacked structure made up of a FeCoCu layer and a FeCo layer. In these combinations, the Cu concentration in the FeCoCu second pinned magnetization layer 50 is in a range of 5 at. % to 15 at. %.

The nonmagnetic coupling layer 49 may be made of a nonmagnetic material including Ru, Rh, Ir, Ru alloy, Rh alloy and Ir alloy, and have a thickness in a range of 0.4 nm to 1.5 nm, and preferably in a range of 0.4 nm to 0.9 nm. A nonmagnetic alloy having at least one element or alloy selected from a group consisting of Co, Cr, Fe, Ni, Mn and alloys thereof added to Ru, is preferably used as a Ru alloy of the nonmagnetic coupling layer 49.

In addition, it is desirable that the first pinned magnetization layer 48 and the second pinned magnetization layer 50 satisfy the following relationship (5), where Bs1 and t1 respectively denote the saturation magnetic flux density and the thickness of the first pinned magnetization layer 48, and Bs2 and t2 respectively denote the saturation magnetic flux density and the thickness of the second pinned magnetization layer 50. By setting Bs1, Bs2, t1 and t2 to satisfy the following relationship (5), it is possible to reduce the effects of the magnetic field applied to the free magnetization layer 45 from each of the first pinned magnetization layer 48 and the second pinned magnetization layer 50, as will be described hereunder.

$$Bs1 \times t1 > Bs2 \times t2 \tag{5}$$

Figure 5A:
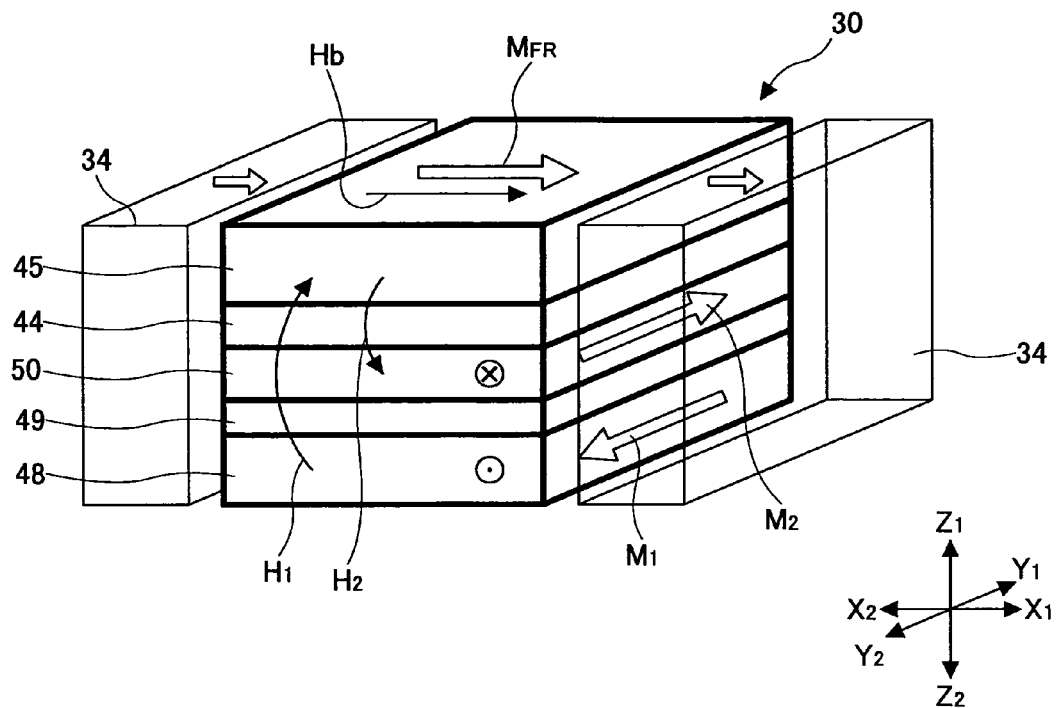
FIGS. 5A and 5B respectively are diagrams for explaining effects of a magnetic field on a magnetization of a free magnetization layer.
Figure 5B:
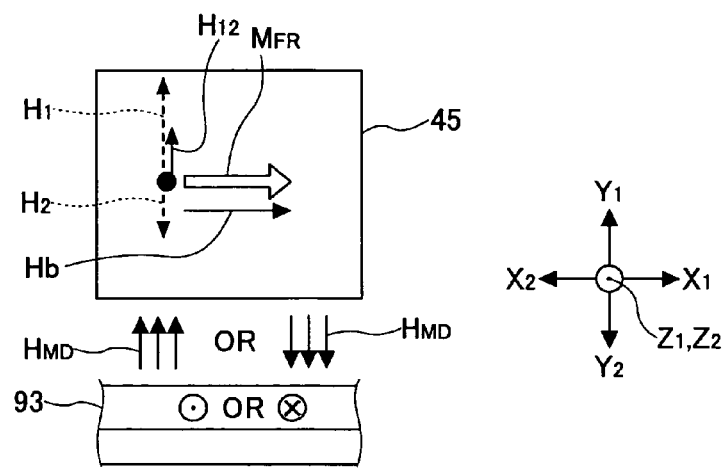

FIGS. 5A and 5B respectively are diagrams for explaining the effects of the magnetic field on the magnetization of the free magnetization layer 45. FIG. 5A is a schematic perspective view showing the GMR layer 30 and the domain control layer 34. For the sake of convenience, the illustration of the underlayer, the antiferromagnetic layer and the protection layer of the GMR layer 30, and the insulator layer between the GMR layer 30 and the domain control layer 34 is omitted in FIG. 5A. In addition, FIG. 5B is a top view showing the free magnetization layer 45. FIG. 5B shows the free magnetization layer 45 together with the magnetic recording medium 93.

As shown in FIGS. 5A and 5B, a bias magnetic field Hb is applied to the free magnetization layer 45 from the domain control layer 34, and a magnetization $M_{FR}$ of the free magnetization layer 45 is orientated in a predetermined direction X1. In addition, a magnetic field H1 generated by a magnetization M1 of the first pinned magnetization layer 48 and a magnetic field H2 generated by a magnetization M2 of the second pinned magnetization layer 50 are applied to the free magnetization layer 45. The magnetic fields H1 and H2 are oriented in mutually opposite directions, because the magnetization M1 of the first pinned magnetization layer 48 and the magnetization M2 of the second pinned magnetization layer 50 are mutually antiferromagnetically exchange-coupled. A combined magnetic field H12 of the magnetic fields H1 and H2 is applied to the magnetization $M_{FR}$ of the free magnetization layer 45 in a direction Y1, for example. Accordingly, a combined magnetic field Hf acts so as to tilt the direction of the magnetization $M_{FR}$ of the free magnetization layer 45 in the direction Y1. When the direction of the magnetization $M_{FR}$ of the free magnetization layer 45 tilts in the direction Y1, a tilt angle of the magnetization $M_{FR}$ of the free magnetization layer 45 does not become symmetrical relative to the direction X1, with respect to the magnetic fields in the directions Y1 and Y2 from the bits recorded in the magnetic recording medium 93. As a result, the peak value of the output reproduced waveform of the magneto-resistive element becomes larger for one polarity than for the other polarity, and the problem of the so-called asymmetry of the reproduced waveform increases. If the asymmetry of the reproduced waveform becomes excessively large, it becomes impossible to accurately reproduce the time intervals of the recorded bits, and an error is easily generated.

In order to suppress the asymmetry of the reproduced waveform, the bias magnetic field Hb is normally set large so that the magnetization $M_{FR}$ of the free magnetization layer 45 is oriented in the direction X1 in a state where no magnetic field is applied from the magnetic recording medium 93. For this reason, the asymmetry of the reproduced waveform is suppressed, but the tilt angle of the magnetization $M_{FR}$ of the free magnetization layer 45 becomes small depending on the magnetic field from the magnetic recording medium 93. In this case, the reproduced output decreases, and as a result, the signal-to-noise ratio (SNR) also decreases.

Hence, the first pinned magnetization layer 48 and the second pinned magnetization layer 50 are set to satisfy the relationship (5) described above. The magnetic field intensity of the magnetic field H1 at the free magnetization layer 45 is proportional to a product Bs1×t1 of the saturation magnetic flux density Bs1 and the thickness t1 of the first pinned magnetization layer 48, and decreases as the distance between the first pinned magnetization layer 48 and the free magnetization layer 45 increases. On the other hand, the magnetic field intensity of the magnetic field H2 at the free magnetization layer 45 is proportional to a product Bs2×t2 of the saturation magnetic flux density Bs2 and the thickness t2 of the second pinned magnetization layer 50, and decreases as the distance between the second pinned magnetization layer 50 and the free magnetization layer 45 increases. Accordingly, by satisfying the relationship (5), it is possible to reduce the combined magnetic field Hf at the free magnetization layer 45. Consequently, the tilt of the direction of the magnetization $M_{FR}$ of the free magnetization layer 45 in the direction Y1 (or direction Y2) is suppressed, to thereby reduce the intensity of the bias magnetic field Hb. As a result, the tilt angle of the magnetization $M_{FR}$ of the free magnetization layer 45 increases depending on the magnetic field from the magnetic recording medium 93. Hence, the reproduced output increases and the SNR is improved, while at the same time suppressing the asymmetry of the output reproduced waveform of the magneto-resistive element.

Any of the saturation magnetic flux densities Bs1 and Bs2 and the thicknesses t1 and t2 may be controlled to set the relationship (5) described above. When the relationship (5) is set by controlling the thicknesses t1 and t2, the following effects can be obtained by setting a relationship $\beta 1 < \beta 2$ between the scattering asymmetry $\beta 1$ of the first pinned magnetization layer 48 and the scattering asymmetry $\beta 2$ of the second pinned magnetization layer 50. For the sake of convenience, the thickness t2 of the second pinned magnetization layer 50 is assumed to be constant.

In a case where the scattering asymmetry $\beta 1$ of the first pinned magnetization layer 48 takes a positive value ($0 < \beta 1 < \beta 2$), the variation $\Delta$RA of the magneto-resistance decreases as the thickness t1 is increased to satisfy the relationship (5). In other words, by increasing the thickness t1, the bulk scattering of the first pinned magnetization layer 48, proportional to t1×$\beta 1$, increases. Since the scattering asymmetries $\beta 1$ and $\beta 2$ take positive values, the bulk scattering of the first pinned magnetization layer 48 acts in a direction so as to decrease the variation $\Delta$RA of the magneto-resistance. However, compared to the conventional GMR layer in which the scattering asymmetries $\beta 1$ and $\beta 2$ are approximately the same, it is possible to obtain a preferable effect of suppressing the decrease of the variation $\Delta$RA of the magneto-resistance.

On the other hand, in a case where the scattering asymmetry $\beta 1$ of the first pinned magnetization layer 48 takes a negative value ($\beta 1 < 0 < \beta 2$), the variation $\Delta$RA of the magneto-resistance increases as the thickness t1 is increased to satisfy the relationship (5). In other words, by increasing the thickness t1, the bulk scattering of the first pinned magnetization layer 48 increases. Since the scattering asymmetry $\beta 1$ takes the negative value and the scattering asymmetry $\beta 2$ takes the positive value, the bulk scattering of the first pinned magnetization layer 48 acts in a direction so as to increase the variation $\Delta$RA of the magneto-resistance. Thus, it is possible to obtain a preferable effect of further increasing the variation $\Delta$RA of the magneto-resistance.

Although the thickness t2 of the second pinned magnetization layer 50 is assumed to be constant in the above described case, it is of course possible to obtain similar effects when the thickness t1 of the first pinned magnetization layer 48 and the thickness t2 of the second pinned magnetization layer 50 undergo similar changes.

Furthermore, according to a micro-magnetics simulation employing the Landau-Lifshitz-Gilbert (LLG) equation carried out by the present inventors using, as parameters, the thicknesses and the saturation magnetic flux densities of the first and second pinned magnetization layers 48 and 50, the distance between the free magnetization layer 45 and the first pinned magnetization layer 48, the distance between the free magnetization layer 45 and the second pinned magnetization layer 50 and the like, it was found that it is more preferable for the first and second pinned magnetization layers 48 and 50 to satisfy the following relationship (6). When the relationship (6) is satisfied, it is possible to further reduce the combined magnetic field H12 that is applied to the free magnetization layer 45, and to further reduce the asymmetry of the reproduced waveform of the magneto-resistive element.

$$1.1 \leq (Bs1 \times t1)/(Bs2 \times t2) \leq 2.0 \quad (6)$$

In addition, according to simulations carried out by setting a read gap length (a distance between an interface between the lower electrode 28 and the GMR layer 30 shown in FIG. 3 and an interface between the upper electrode 32 and the GMR layer 30) to 50 nm, and the product Bs1×t1 of the saturation magnetic flux density Bs1 and the thickness t1 of the first pinned magnetization layer 48 to 5.3 nmT and 6.4 nmT, it was confirmed that the asymmetry of the reproduced waveform of the magneto-resistive element is suppressed the most when (Bs1×t1)/(Bs2×t2) is in a range of 1.40 to 1.50.

The nonmagnetic intermediate layer 44 may be formed by a conductive material that is sputtered, for example, to a thickness in a range of 1.5 nm to 10 nm. The conductive material used for the nonmagnetic intermediate layer 44 may be Cu, Al or the like. In this case, it is possible to form a magneto-resistive element having a spin-valve layer.

The free magnetization layer 45 may be formed by a ferromagnetic material that is sputtered, for example, to a thickness in a range of 1 nm to 30 nm, on the surface of the nonmagnetic intermediate layer 44. The ferromagnetic material used for the free magnetization layer 45 may be NiFe, FeCo, FeCoB and the like. The free magnetization layer 45 may be formed on a single layer made of such a ferromagnetic material or, formed by a stacked structure made up of a plurality of stacked layers made of such ferromagnetic materials. The magnetization direction of the free magnetization layer 45 is oriented in the in-plane direction, and the magnetization direction changes depending on the direction of the leakage magnetic field from the magnetic recording medium. As a result, the resistance of the stacked structure made up of the pinned magnetization layer 43, the nonmagnetic intermediate layer 44 and the free magnetization layer 45 varies in correspondence with an angle formed by the magnetization direction of the free magnetization layer 45 and the magnetization direction of the pinned magnetization layer 43.

Figure 6:
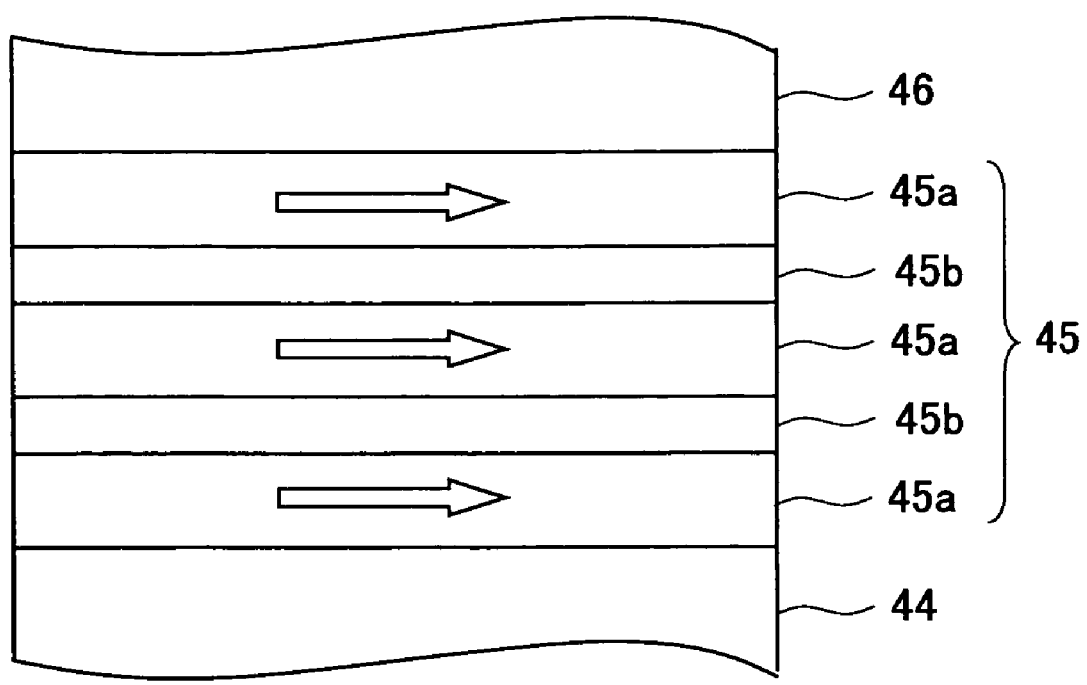
FIG. 6 is a cross sectional view, on an enlarged scale, showing an important part of another free magnetization layer.

FIG. 6 is a cross sectional view, on an enlarged scale, showing an important part of another free magnetization layer. The free magnetization layer 45 shown in FIG. 6 has a so-called stacked free magnetization layer structure made up of a repetition of alternately disposed ferromagnetic layers 45a and nonmagnetic conductive layers 45b. FIG. 6 shows a case where the stacked free magnetization layer structure is made up of 2 repetitions of the alternately disposed ferromagnetic layers 45a and nonmagnetic conductive layers 45b, with the ferromagnetic layers 45a forming the top and bottom surfaces (that is, top and bottom layer portions) of the free magnetization layer 45. The ferromagnetic layers 45a are made of a material similar to that of the free magnetization layer 45 described above. The nonmagnetic conductive layers 45b are made of a material similar to that of the nonmagnetic intermediate layer 44 described above, and are preferably made of Cu. By employing the stacked free magnetization layer structure for the free magnetization layer 45, it is possible to reduce the coercivity of the free magnetization layer 45 and improve the magnetic field sensitivity, so as to improve the magneto-resistance variation rate.

The number of times the alternately disposed ferromagnetic layers 45a and nonmagnetic conductive layers 45b are repeated in the stacked free magnetization layer structure is preferably in a range of 2 to 3. The ferromagnetic layer 45a preferably has a thickness in a range of 1 nm to 2 nm, and the nonmagnetic conductive layer 45b preferably has a thickness in a range of 0.3 nm to 2 nm. In addition, the ferromagnetic layer 45a may be formed by a stacked structure made up of a plurality of ferromagnetic layers having different compositions. The different compositions include alloys made of different elements, and alloys made of the same elements but having different at. % of elements.

Returning now to the description of FIG. 4, the protection layer 46 is formed on the surface of the free magnetization layer 45 by sputtering, for example. The protection layer 45 may be formed by a single conductive layer made of Ru, Cu, Ta, Au, Al or W or, a stacked structure made up of two or more such conductive layers. The protection layer 46 prevents the GMR layer 30 from becoming oxidized when carrying out the thermal process to generate the antiferromagnetic properties of the antiferromagnetic layer 42. By using a Cu protection layer 46, it is possible to improve the magneto-resistance variation rate by forming a magnetic/nonmagnetic interface with the free magnetization layer 45.

According to this embodiment, it is possible to increase the variation $\Delta$RA of the magneto-resistance of the magneto-resistive element by forming the first pinned magnetization layer 48, that is, the resistance control layer 48, from the ferromagnetic layer having the scattering asymmetry $\beta 1$ that is smaller than the scattering asymmetry $\beta 2$ of the second pinned magnetization layer 50. As a result, it is possible to improve the magneto-resistance variation rate of the magneto-resistive element.

Moreover, since the first pinned magnetization layer 48 and the second pinned magnetization layer 50 satisfy the relationship (5) described above, it is possible to increase the reproduced output of the magneto-resistive element while suppressing the asymmetry of the output reproduced waveform of the magneto-resistive element. As a result, the SNR of the magneto-resistive element increases. In addition, when controlling the thicknesses t1 and t2 of the first and second pinned magnetization layers 48 and 50 in order to satisfy the relationship (5) described above, the scattering asymmetry $\beta 1$ of the first pinned magnetization layer 48 and the scattering asymmetry $\beta 2$ of the second pinned magnetization layer 50 satisfy a relationship $\beta 1 < \beta 2$, and thus, it is possible to suppress the amount of decrease of the variation $\Delta$RA of the magneto-resistance or to increase the variation $\Delta$RA of the magneto-resistance even when the thickness t1 is increased, when compared to the case where $\beta 1 = \beta 2$.

Next, a description will be given of cases other than the case where the first pinned magnetization layer 48 of the pinned magnetization layer 43 is made up solely of the resistance control layer 48, that is, cases where a ferromagnetic layer is provided with respect to a resistance control layer on a side closer to the antiferromagnetic layer 42.

Figure 7:
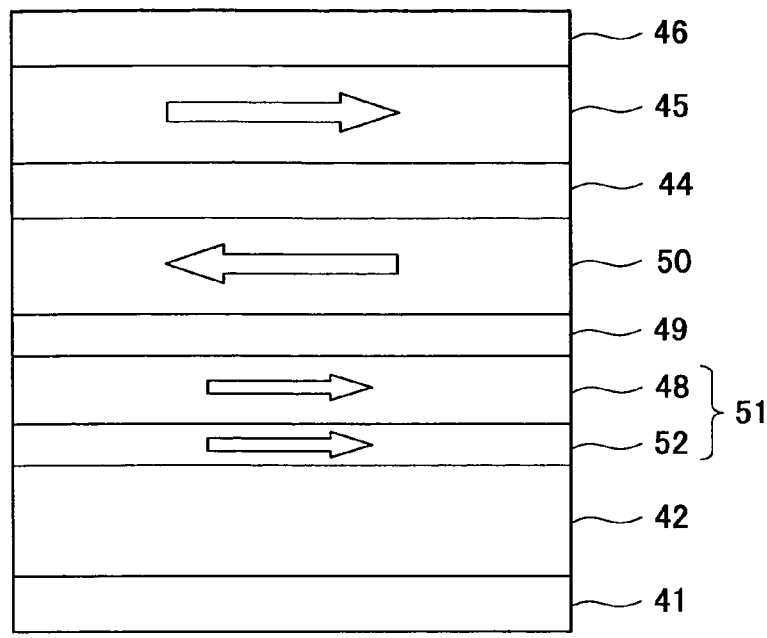
FIG. 7 is a cross sectional view showing a GMR layer of a first modification of the first embodiment of the magneto-resistive element.

FIG. 7 is a cross sectional view showing a GMR layer of a first modification of the first embodiment of the magneto-resistive element. In FIG. 7, those parts that are the same as those corresponding parts in FIG. 4 are designated by the same reference numerals, and a description thereof will be omitted.

The magneto-resistive element shown in FIG. 7 has a CPP structure including a GMR layer 130 having a single spin valve structure. The GMR layer 130 includes an underlayer 41, an antiferromagnetic layer 42, a first pinned magnetization layer 51, a nonmagnetic coupling layer 49, a second pinned magnetization layer 50, a nonmagnetic intermediate layer 44, a free magnetization layer 45 and a protection layer 46 that are successively stacked. The first pinned magnetization layer 51 has a stacked structure including a ferromagnetic bonding layer 52 and a resistance control layer 48 that are successively stacked on the antiferromagnetic layer 42. The structure of the GMR layer 130 is similar to that of the first embodiment shown in FIG. 4, except for the structure of the first pinned magnetization layer 51.

The ferromagnetic bonding layer 52 of the first pinned magnetization layer 51 is made of a ferromagnetic material similar to that of the free magnetization layer 45, such as FeCo and NiFe, and preferably has a thickness in a range of 0.5 nm to 2 nm. The ferromagnetic bonding layer 52 is exchange-coupled to the resistance control layer 48, and is also exchange-coupled to the antiferromagnetic layer 42. Accordingly, the ferromagnetic bonding layer 52 assists the exchange-coupling of the antiferromagnetic layer 42 and the resistance control layer 48, so that the magnetization direction of the resistance control layer 48 is stably pinned. In addition, when the concentration of the additive element in the resistance control layer 48 is increased, the exchange-coupling field of the resistance control layer 48 itself decreases and the exchange-coupling with the antiferromagnetic layer 42 tends to decreases, but the decrease of the exchange-coupling is prevented by the provision of the ferromagnetic bonding layer 52.

Preferably, the saturation magnetization per unit volume of the ferromagnetic bonding layer 52 is larger than that of the resistance control layer 48. In this case, it is possible to make the ferromagnetic bonding layer 52 thin, so as to suppress the effects of the ferromagnetic bonding layer 52 with respect to the magnetic resistance even though the scattering asymmetry $\beta$ of the ferromagnetic bonding layer 52 tends to become larger than that of the resistance control layer 48. Preferably, a relationship between a thickness T1 of the ferromagnetic bonding layer 52 and a thickness T2 of the resistance control layer 48 is set in a range of T1:T2=0.5:4 to 2:1. The ferromagnetic bonding layer 52 may be formed by a stacked structure made up of a plurality of ferromagnetic layers having the different compositions described above. The different compositions include alloys made of different elements, and alloys made of the same elements but having different at. % of elements.

According to this modification, it is possible to increase the exchange-coupling between the antiferromagnetic layer 42 and the resistance control layer 48 by providing the ferromagnetic bonding layer 52 between the antiferromagnetic layer 42 and the resistance control layer 48. On the other hand, it is possible to increase the concentration of the additive element in the resistance control layer 48, so as to increase the variation $\Delta$RA of the magneto-resistance.

Next, a description will be given of a case where a ferromagnetic bonding layer is provided with respect to a resistance control layer on a side closer to the second pinned magnetization layer 50.

Figure 8:
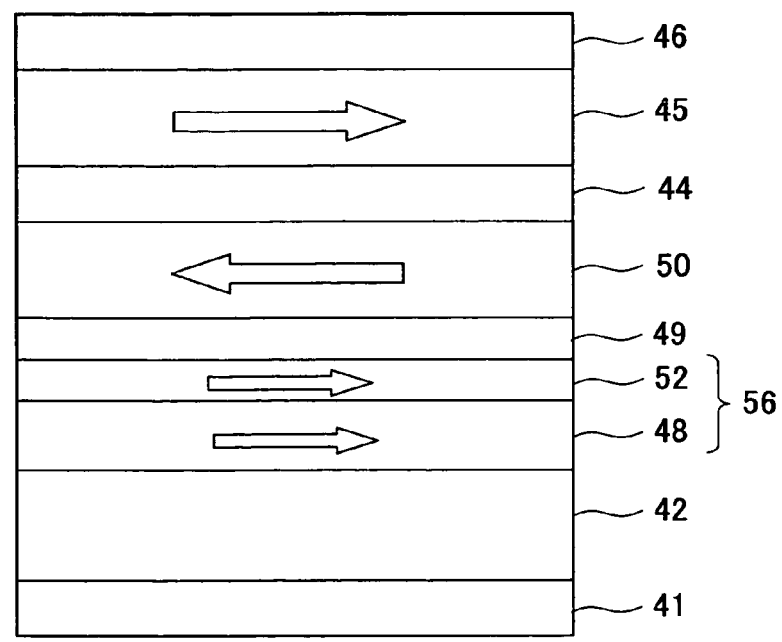
FIG. 8 is a cross sectional view showing a GMR layer of a second modification of the first embodiment of the magneto-resistive element.

FIG. 8 is a cross sectional view showing a GMR layer of a second modification of the first embodiment of the magneto-resistive element. In FIG. 8, those parts that are the same as those corresponding parts in FIGS. 4 and 7 are designated by the same reference numerals, and a description thereof will be omitted.

The magneto-resistive element shown in FIG. 8 has a CPP structure including a GMR layer 230 having a single spin valve structure. The GMR layer 230 includes an underlayer 41, an antiferromagnetic layer 42, a first pinned magnetization layer 56, a nonmagnetic coupling layer 49, a second pinned magnetization layer 50, a nonmagnetic intermediate layer 44, a free magnetization layer 45 and a protection layer 46 that are successively stacked. The first pinned magnetization layer 56 has a stacked structure including a resistance control layer 48 and a ferromagnetic bonding layer 52 that are successively stacked on the antiferromagnetic layer 42. The structure of the GMR layer 230 is similar to that of the first embodiment shown in FIG. 4, except for the structure of the first pinned magnetization layer 56.

The ferromagnetic bonding layer 52 of the first pinned magnetization layer 56 is made of a ferromagnetic material similar to that of the first modification described above, such as FeCo and NiFe, and preferably has a thickness in a range of 0.5 nm to 1 nm. The ferromagnetic bonding layer 52 is exchange-coupled to the resistance control layer 48, and is also antiferromagnetically exchange-coupled to the second pinned magnetization layer 50. Accordingly, the ferromagnetic bonding layer 52 stably pins the magnetization direction of the second pinned magnetization layer 50.

In addition, when the concentration of the additive element in the resistance control layer 48 is increased, the exchange-coupling field of the resistance control layer 48 itself decreases, but the decrease of the exchange-coupling between the resistance control layer 48 and the second pinned magnetization layer 50 is suppressed or, the exchange-coupling between the resistance control layer 48 and the second pinned magnetization layer 50 is increased, by the provision of the ferromagnetic bonding layer 52.

Preferably, the saturation magnetization per unit volume of the ferromagnetic bonding layer 52 is larger than that of the resistance control layer 48, similarly to the first modification described above. The ferromagnetic bonding layer 52 may be formed by a stacked structure made up of a plurality of ferromagnetic layers having the different compositions described above. The different compositions include alloys made of different elements, and alloys made of the same elements but having different at. % of elements.

Next, a description will be given of a case where a first pinned magnetization layer has a structure that is a combination of the first and second modifications described above.

Figure 9:
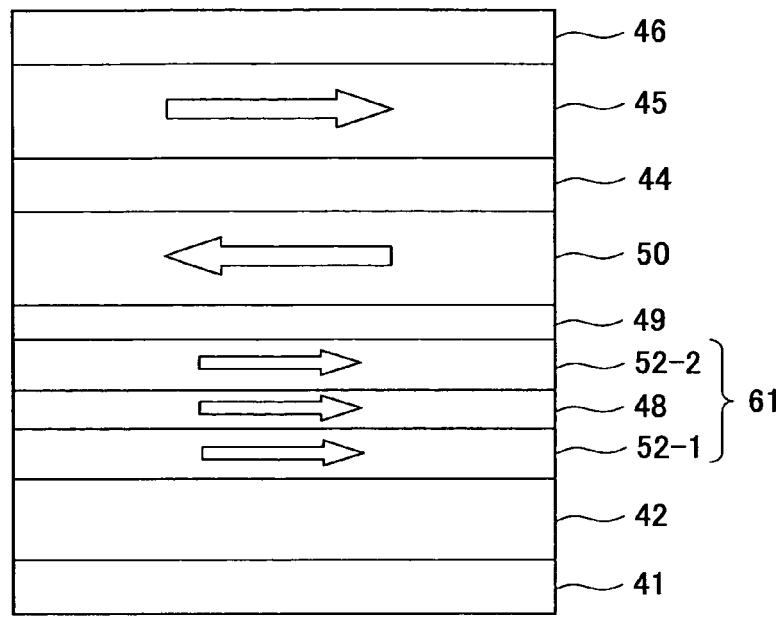
FIG. 9 is a cross sectional view showing a GMR layer of a third modification of the first embodiment of the magneto-resistive element.

FIG. 9 is a cross sectional view showing a GMR layer of a third modification of the first embodiment of the magneto-resistive element. In FIG. 9, those parts that are the same as those corresponding parts in FIGS. 4, 7 and 8 are designated by the same reference numerals, and a description thereof will be omitted.

The magneto-resistive element shown in FIG. 9 has a CPP structure including a GMR layer 330 having a single spin valve structure. The GMR layer 330 includes an underlayer 41, an antiferromagnetic layer 42, a first pinned magnetization layer 61, a nonmagnetic coupling layer 49, a second pinned magnetization layer 50, a nonmagnetic intermediate layer 44, a free magnetization layer 45 and a protection layer 46 that are successively stacked. The first pinned magnetization layer 61 has a stacked structure including a first ferromagnetic bonding layer 52-1, a resistance control layer 48 and a second ferromagnetic bonding layer 52-2 that are successively stacked on the antiferromagnetic layer 42. The structure of the GMR layer 330 is similar to that of the first embodiment shown in FIG. 4, except for the structure of the first pinned magnetization layer 61.

The first and second ferromagnetic bonding layers 52-1 and 52-2 of the first pinned magnetization layer 61 are formed similarly to the ferromagnetic bonding layer 52 of the first and second modifications described above. In addition, the resistance control layer 48 of the first pinned magnetization layer 61 is formed similarly to the resistance control layer 48 of the first embodiment. In this modification, the resistance control layer 48 is exchange-coupled to the ferromagnetic bonding layers 52-1 and 52-2 that are disposed under and above the resistance control layer 48, and thus, the saturation magnetization of the resistance control layer 48 can be decreased. Accordingly, the concentration of the additive element in the resistance control layer 48 can be increased compared to the first and second modifications described above, and the scattering asymmetry β of the resistance control layer 48 can further be decreased.

According to this modification, the first ferromagnetic bonding layer 52-1 is exchange-coupled to the antiferromagnetic layer 42 and the second ferromagnetic bonding layer 52-2 is exchange-coupled to the second pinned magnetization layer 50. As a result, it is possible to stabilize the magnetization directions of the first and second pinned magnetization layers 61 and 50, and increase the variation ΔRA of the magneto-resistance.

Next, a description will be given of a case where a first pinned magnetization layer has a ferromagnetic bonding layer and two resistance control layers respectively disposed above and under the ferromagnetic bonding layer.

Figure 10:
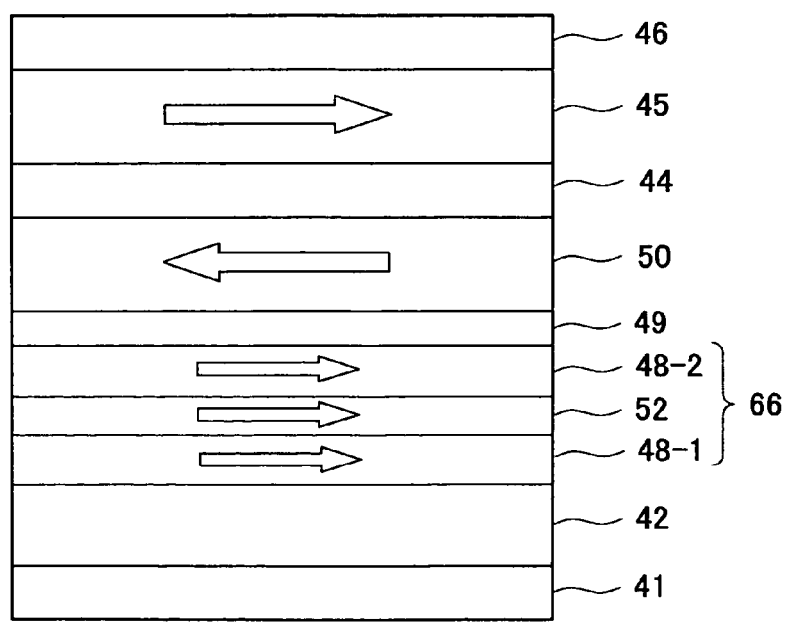
FIG. 10 is a cross sectional view showing a GMR layer of a fourth modification of the first embodiment of the magneto-resistive element.

FIG. 10 is a cross sectional view showing a GMR layer of a fourth modification of the first embodiment of the magneto-resistive element. In FIG. 10, those parts that are the same as those corresponding parts in FIGS. 4 and 7 through 9 are designated by the same reference numerals, and a description thereof will be omitted.

The magneto-resistive element shown in FIG. 10 has a CPP structure including a GMR layer 430 having a single spin valve structure. The GMR layer 430 includes an underlayer 41, an antiferromagnetic layer 42, a first pinned magnetization layer 66, a nonmagnetic coupling layer 49, a second pinned magnetization layer 50, a nonmagnetic intermediate layer 44, a free magnetization layer 45 and a protection layer 46 that are successively stacked. The first pinned magnetization layer 66 has a stacked structure including a first resistance control layer 48-1, a ferromagnetic bonding layer 52, and a second resistance control layer 48-2 that are successively stacked on the antiferromagnetic layer 42. The structure of the GMR layer 430 is similar to that of the first embodiment shown in FIG. 4, except for the structure of the first pinned magnetization layer 66.

The first and second resistance control layers 48-1 and 48-2 of the first pinned magnetization layer 66 are formed similarly to the resistance control layer 48 of the first embodiment described above. In this modification, the first resistance control layer 48-1 is ferromagnetically exchange-coupled to the second resistance control layer 48-2 via the ferromagnetic bonding layer 52, by providing the ferromagnetic bonding layer 52 between the first and second resistance control layers 48-1 and 48-2.

According to this modification, it is possible to stabilize the magnetization directions of the first and second pinned magnetization layers 66 and 50, and to increase a total thickness of the first and second resistance control layers 48-1 and 48-2. As a result, it is possible to increase the variation ΔRA of the magneto-resistance.

Of course, the first pinned magnetization layer 66 is not limited to the 3-layer structure of this modification, and the first pinned magnetization layer 66 may be formed by a stacked structure having 4 or more layers, that is, a repetition of alternately stacked resistance control layers and ferromagnetic bonding layers.

Next, a description will be given of a magneto-resistive element having a CPP structure including a GMR layer with a dual spin valve structure.

Figure 11:
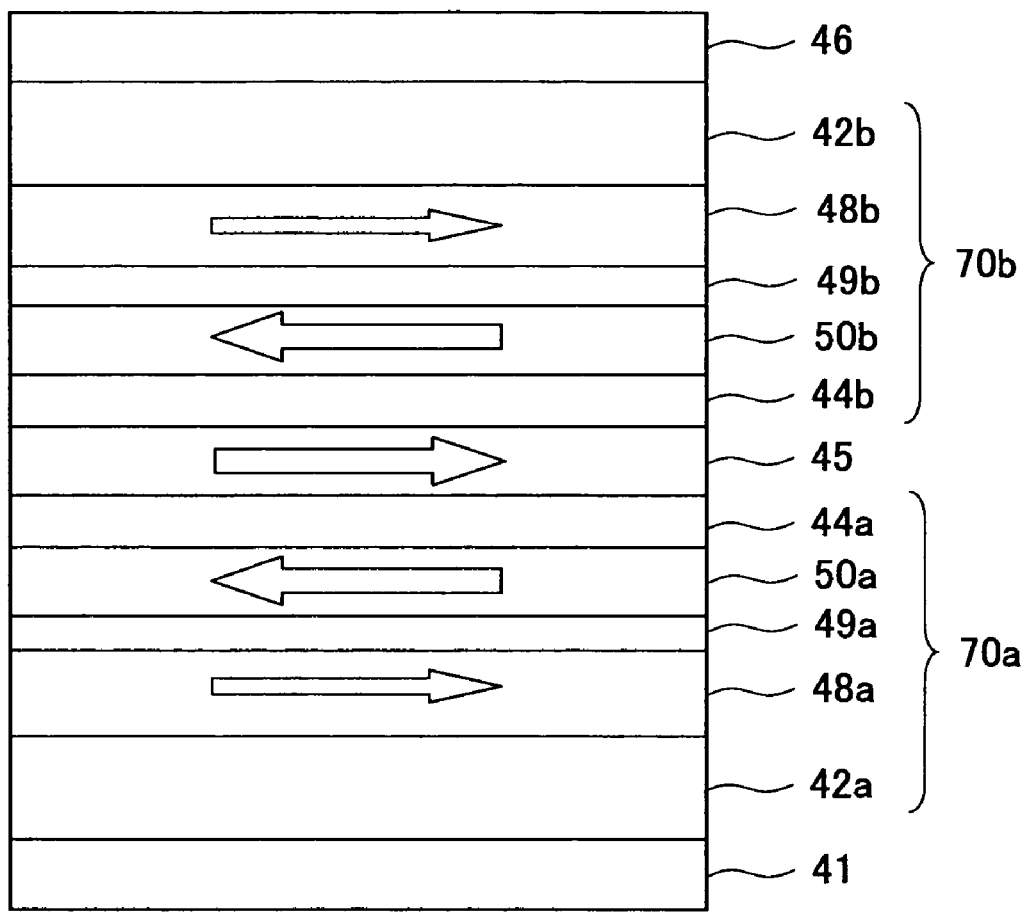
FIG. 11 is a cross sectional view showing a GMR layer of a fifth modification of the first embodiment of the magneto-resistive element.

FIG. 11 is a cross sectional view showing a GMR layer of a fifth modification of the first embodiment of the magneto-resistive element. In FIG. 11, those parts that are the same as those corresponding parts in FIG. 4 are designated by the same reference numerals, and a description thereof will be omitted.

The magneto-resistive element shown in FIG. 11 has a CPP structure including a GMR layer 530 having a dual spin valve structure. The GMR layer 530 includes an underlayer 41, a lower stacked structure 70a, a free magnetization layer 45, an upper stacked structure 70b and a protection layer 46 that are successively stacked. The lower stacked structure 70a includes a lower antiferromagnetic layer 42a, a lower first pinned magnetization layer (lower resistance control layer) 48a, a lower nonmagnetic coupling layer 49a, a lower second pinned magnetization layer 50a and a lower nonmagnetic intermediate layer 44a that are successively stacked on the underlayer 41. The upper stacked structure 70b includes an upper nonmagnetic intermediate layer 44b, an upper second pinned magnetization layer 50b, an upper nonmagnetic coupling layer 49b, an upper first pinned magnetization layer (upper resistance control layer) 48b and an upper antiferromagnetic layer 42b that are successively stacked on the free magnetization layer 45.

The GMR layer 530 shown in FIG. 11 basically has two GMR layers 30 of the first embodiment shown in FIG. 4 that are disposed symmetrically about the free magnetization layer 45. For this reason, the variation ΔRA of the magneto-resistance as a whole in the GMR layer 530 is approximately 2 times that in the GMR layer 30 shown in FIG. 4. Consequently, the magneto-resistance variation rate of this modification can be made approximately 2 times that of the first embodiment.

Each layer of the GMR layer 530 of this modification may be made by a material similar to that of the corresponding layer of the GMR layer 30 of the first embodiment. From the point of view of the relationship of the magneto-resistance and the applied magnetic field, the corresponding layers of the lower stacked structure 70a and the upper stacked structure 70b are preferably made of approximately the same material with approximately the same thickness. Of course, each of the upper and lower first pinned magnetization layers 48b and 48a may employ the structure of the first pinned magnetization layer of any of the first through fourth modifications described above.

In addition, it is desirable that the lower first pinned magnetization layer (lower resistance control layer) 48a and the lower second pinned magnetization layer 50a satisfy a relationship similar to the relationship (5) described above for the first pinned magnetization layer 48 and the second pinned magnetization layer 50 shown in FIG. 4. By satisfying the relationship (5), it is possible to reduce the effects of the combined magnetic field from the lower first pinned magnetization layer 48a and the lower second pinned magnetization layer 50a on the magnetization of the free magnetization layer 45. As a result, it is possible to reduce the asymmetry of the output reproduced waveform of the magneto-resistive element.

Moreover, it is further desirable that the lower first pinned magnetization layer (lower resistance control layer) 48a and the lower second pinned magnetization layer 50a satisfy a relationship similar to the relationship (6) described above. By satisfying the relationship (6), it is possible to further reduce the effects of the combined magnetic field from the lower first pinned magnetization layer 48a and the lower second pinned magnetization layer 50a on the magnetization of the free magnetization layer 45. As a result, it is possible to further reduce the asymmetry of the output reproduced waveform of the magneto-resistive element.

Furthermore, it is desirable that the upper first pinned magnetization layer 48b and the upper second pinned magnetization layer 50b satisfy a relationship similar to the relationship (5) described above. In other words, it is desirable that the upper first pinned magnetization layer 48b and the upper second pinned magnetization layer 50b satisfy the following relationship (7), where Bs3 and t3 respectively denote the saturation magnetic flux density and the thickness of the upper first pinned magnetization layer 48b, and Bs4 and t4 respectively denote the saturation magnetic flux density and the thickness of the upper second pinned magnetization layer 50b. By setting Bs3, Bs4, t3 and t4 to satisfy the following relationship (7), it is possible to reduce the effects of the combined magnetic field from the upper first pinned magnetization layer 48b and the upper second pinned magnetization layer 50b on magnetization of the free magnetization layer 45. As a result, it is possible to reduce the asymmetry of the output reproduced waveform of the magneto-resistive element.

$$Bs3 \times t3 > Bs4 \times t4 \tag{7}$$

In addition, it is further desirable that the upper first pinned magnetization layer 48b and the upper second pinned magnetization layer 50b satisfy the following relationship (8). By setting Bs3, Bs4, t3 and t4 to satisfy the following relationship (8), it is possible to further reduce the effects of the combined magnetic field from the upper first pinned magnetization layer 48b and the upper second pinned magnetization layer 50b on magnetization of the free magnetization layer 45. As a result, it is possible to further reduce the asymmetry of the output reproduced waveform of the magneto-resistive element.

$$1.1 \leq (Bs3 \times t3)/(Bs4 \times t4) \leq 2.0 \tag{8}$$

Of course, it is desirable that the lower first pinned magnetization layer 48a and the lower second pinned magnetization layer 50a, and the upper first pinned magnetization layer 48b and the upper second pinned magnetization layer 50b simultaneously satisfy the relationships (5) and (7), respectively, and it is further desirable that the lower first pinned magnetization layer 48a and the lower second pinned magnetization layer 50a, and the upper first pinned magnetization layer 48b and the upper second pinned magnetization layer 50b simultaneously satisfy the relationships (6) and (8), respectively.

According to this modification, it is possible to increase the variation ΔRA of the magneto-resistance as a whole in the GMR layer 530, by employing the dual spin valve structure or the ferromagnetic tunnel junction type magneto-resistive element structure.

Next, a description will be given of embodiments and comparison examples of the magneto-resistive element.

A second embodiment of the magneto-resistive element is formed as follows. A lower electrode is formed on a silicon substrate. A stacked structure made up of a 250 nm thick Cu layer, a 30 nm thick Ti layer, a 10 nm thick Ta layer, and a 10 nm thick NiFe layer is formed on the lower electrode. Then, each layer of a stacked structure, from an underlayer to a protection layer, is successively formed by a sputtering apparatus. The stacked structure is formed by ion milling into stacked pieces (GMR layers) having 9 different dimensions (contact areas) in a range of 0.2 μm in length×0.2 μm in width to 1.0 μm in length×1.0 μm in width. For each dimension, 20 stacked pieces were made.

Then, the stacked piece is covered by a silicon oxide layer for insulation, and a dry etching is carried out to expose the protection layer. An upper electrode made of Au which electrically connects to the protection layer is formed on the protection layer. A thermal process to generate the antiferromagnetic properties of the antiferromagnetic layer is carried out after forming the protection layer, at a heating temperature of 280° C. for a heating time (or processing time) of approximately 3 hours, within a magnetic field by applying a magnetic field of 1592 kA/m.

Hence, this embodiment merely applies the structure of the pinned magnetization layer of the second modification of the first embodiment to the fifth modification (dual spin valve structure). Each layer of the magneto-resistive element is formed in the following manner from the substrate, where each numerical value in brackets indicates the thickness of the corresponding layer for both the embodiments and the comparison examples.

Second Embodiment

Underlayer: $Ni_{63}Cr_{37}$ (7 nm)
Lower Antiferromagnetic Layer: Pd25Pt15Mn60 (18 nm)
Lower First Pinned Magnetization Layer: Resistance Control Layer: $Fe_{9.5}Co_{85.5}Ta_5$ (1 nm)/Ferromagnetic Bonding Layer: $Fe_{40}Co_{60}$ (2 nm)
Lower Nonmagnetic Coupling Layer: Ru (0.75 nm)
Lower Second Pinned Magnetization Layer: $Fe_{42.5}Co_{42.5}Cu_{15}$ (4 nm)
Lower Nonmagnetic Intermediate Layer: Cu (4 nm)
Free Magnetization Layer: $Fe_{42.5}Co_{42.5}Cu_{15}$ (7.5 nm)
Upper Nonmagnetic Intermediate Layer: Cu (4 nm)
Upper Second Pinned Magnetization Layer: $Fe_{42.5}Co_{42.5}Cu_{15}$ (4 nm)
Upper Nonmagnetic Coupling Layer: Ru (0.75 nm)
Upper First Pinned Magnetization Layer: Ferromagnetic Bonding Layer: $Fe_{40}Co_{60}$ (2 nm)/Resistance Control Layer: $Fe_{9.5}Co_{85.5}Ta_5$ (1 nm)
Upper Antiferromagnetic Layer: $Pd_{25}Pt_{15}Mn_{60}$ (18 nm)
Protection Layer: Ru (5 nm)

A third embodiment of the magneto-resistive element is similar to the second embodiment described above, except for the compositions of the resistance control layers of the upper and lower first pinned magnetization layers and the thicknesses of Ru used for the upper and lower nonmagnetic intermediate layers. Each layer of this second embodiment of the magneto-resistive element, that is different from that of the second embodiment, is formed in the following manner.

Third Embodiment

Lower First Pinned Magnetization Layer: Resistance Control Layer: $Fe_9Co_{81}Ru_{10}$ (1 nm)/Ferromagnetic Bonding Layer: $Fe_{40}Co_{60}$ (2 nm)
Lower Nonmagnetic Coupling Layer: Ru (0.45 nm)
Upper Nonmagnetic Coupling Layer: Ru (0.45 nm)
Upper First Pinned Magnetization Layer: Ferromagnetic Bonding Layer: $Fe_{40}Co_{60}$ (2 nm)/Resistance Control Layer: $Fe_9Co_{81}Ru_{10}$ (1 nm)

A first comparison example was made without forming the resistance control layer of each of the upper and lower first pinned magnetization layers. In other words, each of the upper and lower first pinned magnetization layers was made solely of the ferromagnetic bonding layer in this first comparison example. Each layer of this first comparison example of the magneto-resistive element, that is different from that of the second embodiment, is formed in the following manner.

FIRST COMPARISON EXAMPLE

Lower First Pinned Magnetization Layer: Ferromagnetic Bonding Layer: $Fe_{40}Co_{60}$ (3 nm)
Upper First Pinned Magnetization Layer: Ferromagnetic Bonding Layer: $Fe_{40}Co_{60}$ (3 nm)

[Evaluation]

The variation ΔR of the magneto-resistance was measured for the magneto-resistive element of each of the second and third embodiments and the first comparison example, and an average value of ΔR was obtained for each magneto-resistive element having approximately the same contact area. Then, the variation ΔRA of the magneto-resistance per unit area was obtained for the magneto-resistive element of each of the second and third embodiments and the first comparison example, from the average value of ΔR and the contact area A. It was confirmed that the 9 kinds of magneto-resistive elements having mutually different contact areas A have ΔRA values that are approximately the same, and an average value of these ΔRA values was regarded as the final ΔRA value. The variation ΔR of the magneto-resistance was measured by setting a current value to become 2 mA, sweeping the external magnetic field parallel to the magnetization direction of the upper and lower second pinned magnetization layers within a range of −79 kA/m to 79 kA/m, and using a digital voltmeter to measure the voltage across the upper and lower electrodes.

FIG. 12 is a diagram showing a variation ΔRA of a magneto-resistance and a magneto-resistance variation rate for embodiments and comparison examples. FIG. 12 shows the variation ΔRA of the magneto-resistance per unit area, a total resistance RA across terminals of the magneto-resistive element, and the magneto-resistance (MR) variation rate (=ΔRA/RA) for each of the second and third embodiments and the first comparison example, together with a ΔRA increase rate of the second and third embodiments with respect to the first comparison example. The MR variation rate is equal to (ΔRA/RA)×100 (%). As will be described later, FIG. 12 also shows the values for fourth and fifth embodiments and second and third comparison examples that will be described later.

As may be seen from FIG. 12, compared to the first comparison example that does not have the resistance control layer in the upper and lower first pinned magnetization layers, the second embodiment having the 1 nm thick $Fe_{9.5}Co_{85.5}Ta_5$ resistance control layer and the third embodiment having the 1 nm thick $Fe_9Co_{81}Ru_{10}$ resistance control layer have larger ΔRA values than the first comparison example. The ΔRA increase rates of the second and third embodiments respectively are 24% and 21%. Accordingly, it was confirmed that the ΔRA value increases by the provision of the resistance control layer.

The MR variation rate is represented by ΔRA/RA×100 using the toral resistance between the terminals of the magneto-resistive element. It was confirmed that the total resistance RA does not increase considerably by the provision of the resistance control layer. Thus, it was confirmed that the MR variation rate increases due to the increase of the ΔRA value.

A fourth embodiment of the magneto-resistive element is similar to the second embodiment described above, except for the structures of the upper and lower first pinned magnetization layers, the upper and lower second pinned magnetization layers and the free magnetization layer. More particularly, the upper and lower first pinned magnetization layers have a 3-layer structure made up of a ferromagnetic bonding layer, a resistance control layer and a ferromagnetic bonding layer. The upper and lower second pinned magnetization layers respectively have a 2-layer structure made up of the upper and lower second pinned magnetization layers of the second embodiment and a ferromagnetic bonding layer. Further, the free magnetization layer has a stacked free magnetization layer structure made up of a repetition of alternately disposed ferromagnetic layers and Cu layers. Each layer of this fourth embodiment of the magneto-resistive element, that is different from that of the second embodiment, is formed in the following manner.

Fourth Embodiment

Lower First Pinned Magnetization Layer: Ferromagnetic Bonding Layer: $Fe_{40}Co_{60}$ (1 nm)/Resistance Control Layer: $Fe_9Co_{81}Ru_{10}$ (2 nm)/Ferromagnetic Bonding Layer: $Fe_{40}Co_{60}$ (1 nm)

Lower Second Pinned Magnetization Layer: Ferromagnetic Layer: $Fe_{60}Co_{40}$ (0.5 nm)/Ferromagnetic Layer: $Fe_{45}Co_{45}Cu_{10}$ (3.5 nm)

Free Magnetization Layer: Ferromagnetic Layer: Cu (1.5 nm)/Ferromagnetic Layer: Cu (1.5 nm)/Ferromagnetic Stacked Structure: $Fe_{60}Co_{40}$ (0.5 nm)/$Fe_{45}Co_{45}Cu_{10}$ (1.5 nm)/$Fe_{60}Co_{40}$ (0.5 nm)

Upper Second Pinned Magnetization Layer: Ferromagnetic Layer: $Fe_{45}Co_{45}Cu_{10}$ (3.5 nm)/Ferromagnetic Layer: $Fe_{60}Co_{40}$ (0.5 nm)

Upper First Pinned Magnetization Layer: Ferromagnetic Bonding Layer: $Fe_{40}Co_{60}$ (1 nm)/Resistance Control Layer: $Fe_9Co_{81}Ru_{10}$ (2 nm)/Ferromagnetic Bonding Layer: $Fe_{40}Co_{60}$ (1 nm)

A second comparison example was made without forming the resistance control layer of each of the upper and lower first pinned magnetization layers. In other words, each of the upper and lower first pinned magnetization layers was made solely of the ferromagnetic bonding layer in this second comparison example. Each layer of this second comparison example of the magneto-resistive element, that is different from that of the fourth embodiment, is formed in the following manner.

SECOND COMPARISON EXAMPLE

Lower First Pinned Magnetization Layer: Ferromagnetic Bonding Layer: $Fe_{40}Co_{60}$ (3 nm)

Upper First Pinned Magnetization Layer: Ferromagnetic Bonding Layer: $Fe_{40}Co_{60}$ (3 nm)

[Evaluation]

The ΔRA value and the MR variation rate were obtained for the fourth embodiment and the second comparison example, by the evaluation method described above. As may be seen from FIG. 12, the ΔRA value of the fourth embodiment increased by 23% with respect to the second comparison example, and the MR variation rate also increased for the fourth embodiment. Hence, it was confirmed that the ΔRA value and the MR variation rate can be increased and improved, by providing the resistance control layer between the two ferromagnetic bonding layers in each of the upper and lower first pinned magnetization layers.

A fifth embodiment of the magneto-resistive element is similar to the second embodiment described above, except for the structures of the upper and lower first pinned magnetization layers, the upper and lower second pinned magnetization layers and the free magnetization layer. More particularly, the upper and lower first pinned magnetization layers have a 3-layer structure made up of a ferromagnetic bonding layer, a resistance control layer and a ferromagnetic bonding layer. The upper and lower second pinned magnetization layers have a 2-layer structure made up of ferromagnetic layers having different compositions. Further, the free magnetization layer has a 3-layer stacked structure. Each layer of this fifth embodiment of the magneto-resistive element, that is different from that of the second embodiment, is formed in the following manner.

Fifth Embodiment

Lower First Pinned Magnetization Layer: Ferromagnetic Bonding Layer: $Fe_{40}Co_{60}$ (1 nm)/Resistance Control Layer: $Co_{90}Cr_{10}$ (0.5 nm)/Ferromagnetic Bonding Layer: $Fe_{40}Co_{60}$ (1 nm)

Lower Second Pinned Magnetization Layer: Ferromagnetic Layer: $Fe_{60}Co_{40}$ (1 nm)/Ferromagnetic Layer: $Fe_{45}Co_{45}Cu_{10}$ (3.5 nm)

Free Magnetization Layer: Ferromagnetic Layer: $Fe_{40}Co_{60}$ (1 nm)/Ferromagnetic Layer: $Ni_{80}Fe_{20}$ (5.5 nm)

Upper Second Pinned Magnetization Layer: Ferromagnetic Layer: $Fe_{45}Co_{45}Cu_{10}$ (3.5 nm)/Ferromagnetic Layer: $Fe_{60}Co_{40}$ (0.5 nm)

Upper First Pinned Magnetization Layer: Ferromagnetic Bonding Layer: $Fe_{40}Co_{60}$ (1 nm)/Resistance Control Layer: $Co_{90}Cr_{10}$ (2 nm)/Ferromagnetic Bonding Layer: $Fe_{40}Co_{60}$ (1 nm)

A third comparison example was made without forming the resistance control layer of each of the upper and lower first pinned magnetization layers. In other words, each of the upper and lower first pinned magnetization layers was made solely of the ferromagnetic bonding layer in this third comparison example. Each layer of this third comparison example of the magneto-resistive element, that is different from that of the fifth embodiment, is formed in the following manner.

THIRD COMPARISON EXAMPLE

Lower First Pinned Magnetization Layer: Ferromagnetic Bonding Layer: $Fe_{40}Co_{60}$ (3 nm)

Upper First Pinned Magnetization Layer: Ferromagnetic Bonding Layer: $Fe_{40}Co_{60}$ (3 nm)

[Evaluation]

The ΔRA value and the MR variation rate were obtained for the fifth embodiment and the third comparison example, by the evaluation method described above. As may be seen from FIG. 12, the ΔRA value of the fifth embodiment increased by 52% with respect to the third comparison example, and the MR variation rate also increased for the fifth embodiment. Hence, it was confirmed that the ΔRA value and the MR variation rate can be increased and improved, by providing the resistance control layer between the two ferromagnetic bonding layers in each of the upper and lower first pinned magnetization layers.

Figure 13:
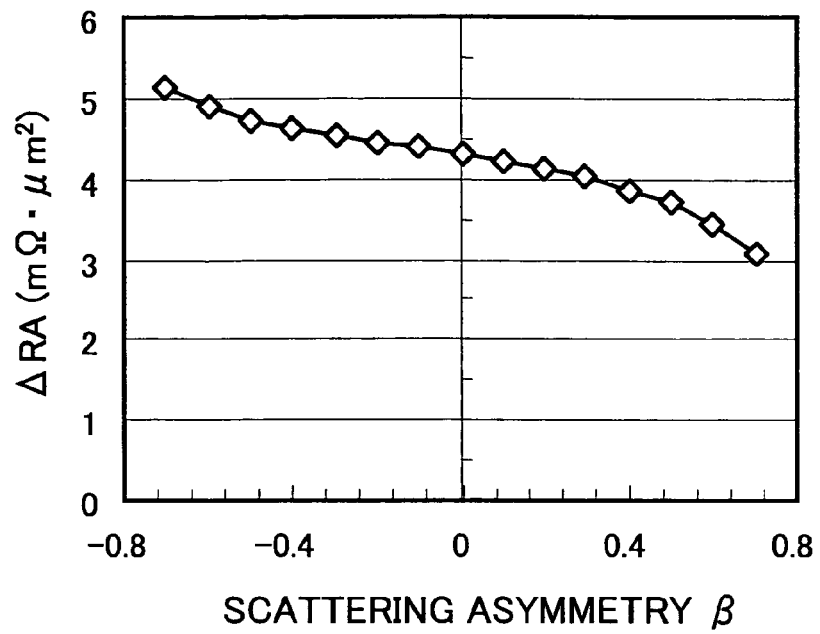
FIG. 13 is a diagram showing a relationship of $\Delta RA$ and a scattering asymmetry $\beta$.

FIG. 13 is a diagram showing a relationship of ΔRA and a scattering asymmetry β. In FIG. 13, the ordinate indicates the ΔRA value (mΩ·μm$^2$), and the ordinate indicates the scattering asymmetry β. The ΔRA value and the scattering asymmetry β shown in FIG. 13 were obtained by simulation for the magneto-resistive element having the GMR layer with the dual spin valve structure. In FIG. 13, the ΔRA value was for a case where the upper and lower first pinned magnetization layers are made of FeCo and the scattering asymmetry β is decreased from 0.7 to −0.7 by adding the additive element described above.

As may be seen from FIG. 13, the ΔRA value simply increases by decreasing the scattering asymmetry β, and that the smaller the asymmetric term β, the smaller the ΔRA value.

Accordingly, it was confirmed by simulation that the ΔRA value can be improved by decreasing the scattering asymmetry β of the first pinned magnetization layer (resistance control layer).

The simulation was made based on Valet and Fert theory of current perpendicular to plane (CPP) giant magneto-resistance (GMR) in metallic multi-layers proposed in Phys. Rev. B48, p. 7099, 1993, by calculating the magnetic resistance taking into consideration the spin-dependent bulk scattering, the spin-dependent interfacial scattering and the spin diffusion length, for a magnetic layer having a multi-layer stacked structure. Details of the calculation may be found in N. Strelkov et al., "Extension of the semiclassical theory of current-perpendicular-to-plane giant magnetoresistance including spin flip to any multilayered magnetic structures", J. Appl. Phys., vol. 94, No.5, 1 Sep. 2003, pp. 3278-3287. A software created by B. Dieny, SPINTEC, France was used for the calculation. The structure of the magneto-resistive element used for the calculation is as follows in the order stacked, where each numerical value in brackets indicates the thickness of the corresponding layer.

Lower Electrode: Cu (100 nm)
    Underlayer: NiCr (5 nm)
    Lower Antiferromagnetic Layer: PdPtMn (18 nm)
    Lower First Pinned Magnetization Layer: $Fe_{60}Co_{40}$ (3 nm)
    Lower Nonmagnetic Coupling Layer: Ru (0.75 nm)
    Lower Second Pinned Magnetization Layer: FeCoCu (4 nm)
    Lower Nonmagnetic Intermediate Layer: Cu (4 nm)
    Free Magnetization Layer: FeCoCu (4 nm)
    Upper Nonmagnetic Intermediate Layer: Cu (4 nm)
    Upper Second Pinned Magnetization Layer: FeCoCu (4 nm)
    Upper Nonmagnetic Coupling Layer: Ru (0.75 nm)
    Upper First Pinned Magnetization Layer: $Fe_{60}Co_{40}$ (3 nm)
    Upper Antiferromagnetic Layer: PdPtMn (18 nm)
    Protection Layer: Ru (5 nm)
    Upper Electrode: Cu (100 nm)

Next, a description will be given of a sixth embodiment of the magneto-resistive element according to the present invention. This sixth embodiment of the magneto-resistive element has a CPP structure, but uses a ferromagnetic Tunnel junction Magneto-Resistive (TMR) layer in place of the GMR layer of the embodiments and modifications described above. More particularly, the TMR layer uses an insulative nonmagnetic intermediate layer in place of the conductive nonmagnetic intermediate layer of the GMR layer in the first embodiment described above. This insulative nonmagnetic intermediate layer will hereinafter be referred to as a nonmagnetic insulator layer. In this case, it is possible to obtain a ferromagnetic magnetic tunneling junction type magneto-resistive element (or layer).

Figure 14:
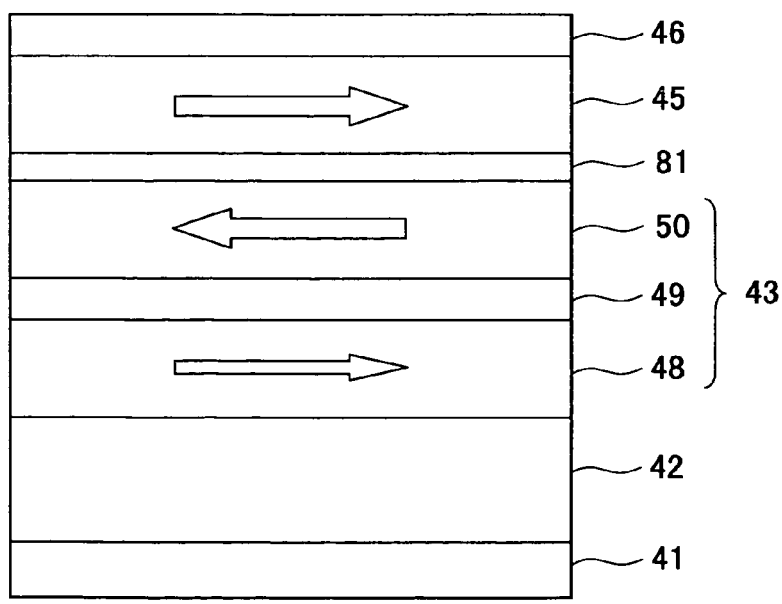
FIG. 14 is a cross sectional view showing a TMR layer forming a sixth embodiment of the magneto-resistive element according to the present invention.

FIG. 14 is a cross sectional view showing a TMR layer forming the sixth embodiment of the magneto-resistive element according to the present invention. The magneto-resistive element shown in FIG. 14 is basically the same as the magneto-resistive element 22 shown in FIG. 3 except for the structure peculiar to a TMR layer 630. Hence, in FIG. 14, those parts that are the same as those corresponding parts in FIG. 4 are designated by the same reference numerals, and a description thereof will be omitted.

The TMR layer 630 shown in FIG. 14 includes an underlayer 41, an antiferromagnetic layer 42, a pinned magnetization layer 43, a nonmagnetic insulator layer 81, a free magnetization layer 45 and a protection layer 46 that are successively stacked. The pinned magnetization layer 43 includes a first pinned magnetization layer (resistance control layer) 48, a nonmagnetic coupling layer 49 and a second pinned magnetization layer 50 that are successively stacked on the antiferromagnetic layer 42.

For example, the nonmagnetic insulator layer 81 is formed by sputtering an insulator material such as aluminum oxide, aluminum nitride and tantalum oxide to a thickness in a range of 0.5 nm to 1.5 nm. The nonmagnetic insulator layer 81 may be formed by directly depositing the insulator material on the second pinned magnetization layer 50. Alternatively, the nonmagnetic insulator layer 81 may be formed on the second pinned magnetization layer 50 by forming a metal layer made of aluminum or the like, subjecting the metal layer to natural oxidation, plasma oxidation or radical oxidation or, nitriding thereof, to transform the metal layer into a metal oxide insulator layer or a metal nitride insulator layer.

The first pinned magnetization layer 48 is made of the resistance control layer described above in conjunction with the first embodiment. Hence, it is possible to increase the variation ΔRA of the magneto-resistance and to improve the magneto-resistance variation rate. In addition, the first pinned magnetization layer 48 may have the structure of any one of the first through fourth modifications of the first embodiment described above.

The TMR layer 630 of this embodiment has a single TMR layer structure. However, the TMR layer may have a dual TMR layer structure, similarly to the dual GMR layer structure of the fifth modification of the first embodiment described above.

According to this sixth embodiment, it is possible to increase the variation ΔRA of the magneto-resistance of the TMR layer 630, because the pinned magnetization layer 43 of the TMR layer 630 has a stacked ferri structure, and the first pinned magnetization layer 48 located on the side of the antiferromagnetic layer 42 functions as the resistance control layer 48, similarly to the first embodiment.

Figure 15:
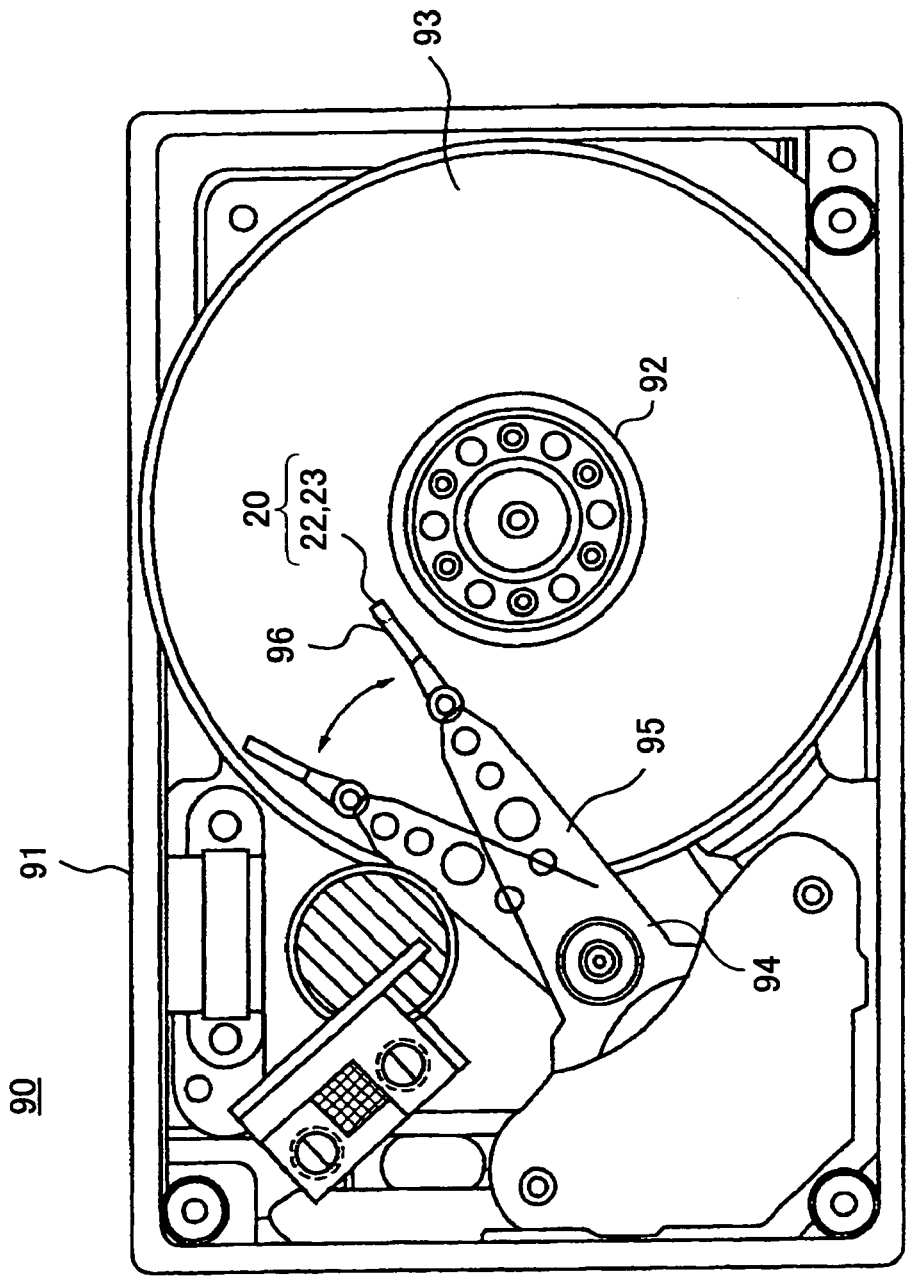
FIG. 15 is a plan view showing an important part of an embodiment of a magnetic storage apparatus according to the present invention.

Next, a description will be given of an embodiment of a magnetic storage apparatus according to the present invention, by referring to FIG. 15. FIG. 15 is a plan view showing an important part of this embodiment of the magnetic storage apparatus according to the present invention.

A magnetic storage apparatus 90 shown in FIG. 15 includes a housing 91. The housing 91 accommodates a hub 92 that is driven by a spindle motor (not shown), a magnetic recording medium 93 that is fixed on the hub 92 and rotated, an actuator unit 94, an arm 95 that is mounted on the actuator unit 94 and moves in a radial direction of the magnetic recording medium 93, a suspension provided on a tip end of the arm 95, and the magnetic head 20 that is supported on the suspension 96.

The magnetic head 20 is made up of the magneto-resistive element 22 that is formed on the ceramic substrate such as $Al_2O_3$—TiC, and the induction type recording element 23 formed on the magneto-resistive element 22, shown in FIG. 3.

This embodiment of the magnetic storage apparatus 90 is characterized by the magneto-resistive element 22. The magneto-resistive element 22 may have the structure of any of the embodiments and modifications of the magneto-resistive element described above.

The basic structure of the magnetic storage apparatus 90 is of course not limited to that shown in FIG. 15, and other known and/or suitable basic structures may be employed. Further, the magnetic recording medium 93 is not limited to a magnetic disk employing the longitudinal (or in-plane) magnetic recording system or the perpendicular magnetic recording system, and may be formed by a magnetic tape, a magnetic card or the like. Moreover, a plurality of magnetic recording media 93 may be accommodated within the housing 90 together with a corresponding number of arms 95, suspensions 96, magnetic heads 20 and the like.

In the first and sixth embodiments described above, for example, the scattering asymmetry $\beta_1$ of the first pinned magnetization layer is smaller than the scattering asymmetry $\beta_2$ of the second pinned magnetization layer ($\beta_1 < \beta_2$). However, the effects of the present invention can also be obtained when the scattering asymmetry $\beta_1$ of the first pinned magnetization layer is larger than the scattering asymmetry $\beta_2$ of the second pinned magnetization layer ($\beta_1 > \beta_2$). That is, the second pinned magnetization layer may be made up of a resistance control layer, and be made of a material having a scattering asymmetry $\beta_2$ smaller than a scattering asymmetry $\beta_1$ of the first pinned magnetization layer. The above described effects (increased $\Delta RA$ value) can be obtained in this case, and the effects become more notable when the relationship $\beta_1 > 0 > \beta_2$ is satisfied. Furthermore, if the above described relationship (5) or (6) is satisfied, it is possible to further increase the $\Delta RA$ value by increasing the thickness t1 of the first pinned magnetization layer.

Further, the present invention is not limited to these embodiments, but various variations and modifications may be made without departing from the scope of the present invention.

What is claimed is:

1. A magneto-resistive element employing a Current Perpendicular to Plane (CPP) structure, comprising:
    a lower electrode, an antiferromagnetic layer, a pinned magnetization layer, a nonmagnetic intermediate layer, a free magnetization layer and an upper electrode that are successively stacked,
    said pinned magnetization layer comprising a first pinned magnetization layer, a nonmagnetic coupling layer and a second pinned magnetization layer that are successively stacked on the antiferromagnetic layer,
    said first and second pinned magnetization layers being antiferromagnetically exchange-coupled,
    one of said first and second pinned magnetization layers being formed by a ferromagnetic layer made of a ferromagnetic material at least including one element or alloy selected from a group consisting of Co, Fe, Ni and alloys thereof,
    the other of said first and second pinned magnetization layers being formed by a resistance control layer made of a ferromagnetic material at least including one element or alloy selected from a group consisting of Co, Fe, Ni and alloys thereof, and an additive element,
    said additive element being at least one element or alloy selected from a group consisting of B, C, N, O, F, Sc, Ti, V, Cr, Mn, Zn, Ga, Ge, As, Se, Y, Zr, Nb, Mo, Tc, Ru, Rh, Pd, Ag, Cd, In, Sn, Sb, Te, Hf, Ta, W, Re, Os, Ir, Pt, Au, Hg, Tl, Pb, Bi, Po, At and alloys thereof, wherein the additive element in the resistance control layer forming the other of said first and second pinned magnetization layers controls a scattering asymmetry thereof so that the first pinned magnetization layer has a scattering asymmetry smaller than that of the second pinned magnetization layer.

2. The magneto-resistive element as claimed in claim 1, wherein said ferromagnetic layer includes an atomic concentration of said additive element lower than that of said resistance control layer.

3. The magneto-resistive element as claimed in claim 2, wherein said additive element is Cu, and said resistance control layer has a Cu content in a range of 5 at. % to 15 at. %.

4. The magneto-resistive element as claimed in claim 1, wherein said resistance control layer is made of a ferromagnetic material including FeCo and at least one element or alloy selected from a group consisting of Ru, Ta, Cr, V and alloys thereof.

5. The magneto-resistive element as claimed in claim 1, wherein said resistance control layer has a concentration of said additive element in a range of 5 at. % to 70 at. %.

6. A magneto-resistive element employing a Current Perpendicular to Plane (CPP) structure, comprising:
    a lower electrode, an antiferromagnetic layer, a pinned magnetization layer, a nonmagnetic intermediate layer, a free magnetization layer and an upper electrode that are successively stacked,
    said pinned magnetization layer comprising a first pinned magnetization layer, a nonmagnetic coupling layer and a second pinned magnetization layer that are successively stacked on the antiferromagnetic layer,
    said first and second pinned magnetization layers being antiferromagnetically exchange-coupled,
    one of said first and second pinned magnetization layers being formed by a ferromagnetic layer made of a ferromagnetic material at least including one element or alloy selected from a group consisting of Co, Fe, Ni and alloys thereof,
    the other of said first and second pinned magnetization layers being formed by a resistance control layer made of a conductive ferromagnetic oxide,
    wherein the resistance control layer forming the other of said first and second pinned magnetization layers controls a scattering asymmetry thereof so that the first pinned magnetization layer has a scattering asymmetry smaller than that of the second pinned magnetization layer.

7. The magneto-resistive element as claimed in claim 6, wherein said ferromagnetic oxide has a spinel structure represented by a molecular formula $AB_2O_4$, where A is at least one kind of element selected from a group consisting of Zn, Fe, Co, Ni, Cu, Mg and Li, and B is at least one kind of element selected from a group consisting of Fe, Co, Ni and Mn.

8. The magneto-resistive element as claimed in claim 6, wherein said ferromagnetic oxide comprises ZnO and at least one element selected from a group consisting of Fe, Co, Ni, Cr and Mn.

9. The magneto-resistive element as claimed in claim 6, wherein said ferromagnetic oxide is selected from a group consisting of $Fe_3O_4$, $SrRuO_3$ and $Sr_2FeMoO_6$.

10. The magneto-resistive element as claimed in claim 6, wherein said nonmagnetic intermediate layer is made of a conductor material or an insulator material.

11. The magneto-resistive element as claimed in claim 6, wherein said nonmagnetic intermediate layer is made of an insulator material is selected from a group consisting of aluminum oxide, aluminum nitride and tantalum oxide, and said nonmagnetic intermediate layer has a thickness in a range of 0.5 nm to 1.5 nm.

12. The magneto-resistive element as claimed in claim 6, wherein said first pinned magnetization layer is formed by the resistance control layer, and further comprising:
    a ferromagnetic bonding layer disposed between said resistance control layer and said antiferromagnetic layer and/or between said resistance control layer and said nonmagnetic coupling layer,
    said ferromagnetic bonding layer being ferromagnetically exchange-coupled to said resistance control layer.

13. The magneto-resistive element as claimed in claim 6, wherein said first pinned magnetization layer comprises a plurality of resistance control layers and at least one ferromagnetic bonding layer, and said ferromagnetic bonding layer is sandwiched between two resistance control layers.

14. The magneto-resistive element as claimed in claim 12, wherein said ferromagnetic bonding layer is made of a ferromagnetic material including at least one element or alloy selected from a group consisting of Co, Fe, Ni and alloys thereof.

15. The magneto-resistive element as claimed in claim 6, wherein a saturation magnetic flux density Bs1 and a thickness t1 of the first pinned magnetization layer and a saturation magnetic flux density Bs2 and a thickness t2 of the second pinned magnetization layer satisfy a relationship $Bs1 \times t1 > Bs2 \times t2$.

16. The magneto-resistive element as claimed in claim 15, wherein said first and second pinned magnetization layers satisfy a relationship $1.1 \leq (Bs1 \times t1)/(Bs2 \times t2) < 2.0$.

17. The magneto-resistive element as claimed in claim 6, further comprising:
   another nonmagnetic intermediate layer, another pinned magnetization layer and another antiferromagnetic layer that are successively stacked on the free magnetization layer,
   said other pinned magnetization layer comprising a third pinned magnetization layer, a nonmagnetic coupling layer and a fourth pinned magnetization layer that are successively arranged under said other antiferromagnetic layer,
   said third and fourth pinned magnetization layers being antiferromagnetically exchange-coupled,
   one of said third and fourth pinned magnetization layers being formed by the resistance control layer,
   the other of said third and fourth pinned magnetization layers being formed by the ferromagnetic layer.

18. The magneto-resistive element as claimed in claim 17, wherein a saturation magnetic flux density Bs3 and a thickness t3 of the third pinned magnetization layer and a saturation magnetic flux density Bs4 and a thickness t4 of the fourth pinned magnetization layer satisfy a relationship $Bs3 \times t3 < Bs4 \times t4$.

19. The magneto-resistive element as claimed in claim 18, wherein said third and fourth pinned magnetization layers satisfy a relationship $1.1 \leq (Bs3 \times t3)/(Bs4 \times t5) < 2.0$.

20. The magneto-resistive element as claimed in claim 6, wherein said free magnetization layer has a stacked free magnetization layer structure made up of a repetition of alternately disposed ferromagnetic layers and nonmagnetic conductive layers.

21. A magnetic head comprising:
   a recording element; and
   a magneto-resistive element,
   said magneto-resistive element employing a Current Perpendicular to Plane (CPP) structure, and comprising a lower electrode, an antiferromagnetic layer, a pinned magnetization layer, a nonmagnetic intermediate layer, a free magnetization layer and an upper electrode that are successively stacked,
   said pinned magnetization layer comprising a first pinned magnetization layer, a nonmagnetic coupling layer and a second pinned magnetization layer that are successively stacked on the antiferromagnetic layer,
   said first and second pinned magnetization layers being antiferromagnetically exchange-coupled,
   one of said first and second pinned magnetization layers being formed by a ferromagnetic layer made of a ferromagnetic material at least including one element or alloy selected from a group consisting of Co, Fe, Ni and alloys thereof,
   the other of said first and second pinned magnetization layers being formed by a resistance control layer made of a ferromagnetic material at least including one element or alloy selected from a group consisting of Co, Fe, Ni and alloys thereof, and an additive element,
   said additive element being at least one element or alloy selected from a group consisting of B, C, N, O, F, Sc, Ti, V, Cr, Mn, Zn, Ga, Ge, As, Se, Y, Zr, Nb, Mo, Tc, Ru, Rh, Pd, Ag, Cd, In, Sn, Sb, Te, Hf, Ta, W, Re, Os, Ir, Pt, Au, Hg, Tl, Pb, Bi, Po, At and alloys thereof,
   wherein the additive element in the resistance control layer forming the other of said first and second pinned magnetization layers controls a scattering asymmetry thereof so that the first pinned magnetization layer has a scattering asymmetry smaller than that of the second pinned magnetization layer.

22. A magnetic storage apparatus comprising:
   a magnetic head configured to record information on and reproduce information from a magnetic recording medium,
   said magnetic head comprising a recording element and a magneto-resistive element,
   said magneto-resistive element employing a Current Perpendicular to Plane (CPP) structure, and comprising a lower electrode, an antiferromagnetic layer, a pinned magnetization layer, a nonmagnetic intermediate layer, a free magnetization layer and an upper electrode that are successively stacked,
   said pinned magnetization layer comprising a first pinned magnetization layer, a nonmagnetic coupling layer and a second pinned magnetization layer that are successively stacked on the antiferromagnetic layer,
   said first and second pinned magnetization layers being antiferromagnetically exchange-coupled,
   one of said first and second pinned magnetization layers being formed by a ferromagnetic layer made of a ferromagnetic material at least including one element or alloy selected from a group consisting of Co, Fe, Ni and alloys thereof,
   the other of said first and second pinned magnetization layers being formed by a resistance control layer made of a ferromagnetic material at least including one element or alloy selected from a group consisting of Co, Fe, Ni and alloys thereof, and an additive element,
   said additive element being at least one element or alloy selected from a group consisting of B, C, N, O, F, Sc, Ti, V, Cr, Mn, Zn, Ga, Ge, As, Se, Y, Zr, Nb, Mo, Tc, Ru, Rh, Pd, Ag, Cd, In, Sn, Sb, Te, Hf, Ta, W, Re, Os, Ir, Pt, Au, Hg, Tl, Pb, Bi, Po, At and alloys thereof,
   wherein the additive element in the resistance control layer forming the other of said first and second pinned magnetization layers controls a scattering asymmetry thereof so that the first pinned magnetization layer has a scattering asymmetry smaller than that of the second pinned magnetization layer.

* * * * *

UNITED STATES PATENT AND TRADEMARK OFFICE
CERTIFICATE OF CORRECTION

| | |
|---|---|
| PATENT NO. | : 7,486,487 B2 |
| APPLICATION NO. | : 11/137008 |
| DATED | : February 3, 2009 |
| INVENTOR(S) | : Hirotaka Oshima |

It is certified that error appears in the above-identified patent and that said Letters Patent is hereby corrected as shown below:

Col. 29, line 39, delete "<" and insert -->-- in the equation.

Col. 29, line 42, delete "< 2.0" and insert --≤ 2.0--.

Col. 30, line 54, delete "Ti" and insert --T1--.

Signed and Sealed this

Twelfth Day of May, 2009

JOHN DOLL
*Acting Director of the United States Patent and Trademark Office*